US007854376B2

(12) United States Patent
Oberoi

(10) Patent No.: US 7,854,376 B2
(45) Date of Patent: Dec. 21, 2010

(54) SYSTEM AND METHOD FOR MANAGING ITEM INTERCHANGE AND IDENTIFICATION IN AN EXTENDED ENTERPRISE

(75) Inventor: Supreet Oberoi, Redwood City, CA (US)

(73) Assignee: Agile Software Corporation, San Jose, CA (US)

(*) Notice: Subject to any disclaimer, the term of this patent is extended or adjusted under 35 U.S.C. 154(b) by 1082 days.

(21) Appl. No.: 11/371,649

(22) Filed: Mar. 9, 2006

(65) Prior Publication Data
US 2006/0235771 A1 Oct. 19, 2006

Related U.S. Application Data

(63) Continuation of application No. PCT/US04/29158, filed on Sep. 7, 2004.

(60) Provisional application No. 60/502,088, filed on Sep. 10, 2003.

(51) Int. Cl.
*G06F 17/00* (2006.01)

(52) U.S. Cl. .................. 235/375; 235/487; 705/75; 705/67

(58) Field of Classification Search .......... 235/375, 235/487; 705/65–69, 75–78
See application file for complete search history.

(56) References Cited

U.S. PATENT DOCUMENTS 5,960,441 A * 9/1999 Bland et al. ............ 707/104.1

| 6,150,921 | A | 11/2000 | Werb et al. |
| 6,232,870 | B1 | 5/2001 | Garber et al. |
| 6,938,019 | B1 * | 8/2005 | Uzo ............................. 705/65 |
| 7,392,255 | B1 * | 6/2008 | Sholtis et al. ............... 707/203 |
| 2002/0046341 | A1 * | 4/2002 | Kazaks et al. ............... 713/182 |
| 2003/0028599 | A1 * | 2/2003 | Kolsky ....................... 709/206 |
| 2008/0040784 | A1 * | 2/2008 | Salva Calcagno .............. 726/9 |

FOREIGN PATENT DOCUMENTS

WO   WO 2005/026993 A1   3/2005

OTHER PUBLICATIONS

PCT Search Report for Application No. PCT/US/2004/29158, mailed on Jan. 13, 2005, 1 page.

* cited by examiner

*Primary Examiner*—Edwyn Labaze
(74) *Attorney, Agent, or Firm*—Townsend and Townsend and Crew LLP

(57) ABSTRACT

A system and method are provided for automatically managing item record interchange in a business enterprise, where an item may be a product, component part, partially assembled or manufactured part, a process, or other item that requires indicia used to identify it within a business enterprise, whether it is a single company enterprise, or a widespread business that receives items from other sources such as manufacturers, suppliers, purchasers, shippers, or other entities. The system provides a universal solution that allows the intake of item records, such as records for manufacturer component parts shipped to a product manufacturer, and integrating the part records from disparate sources into a standard and useable format.

15 Claims, 51 Drawing Sheets

Agile Test 1

File  Edit  View  Insert  Format  Tools  Data  Window  Help

A1  =  Item Number = 73-09311-03

| | A | B | C | D | E | F | G | H | I |
|---|---|---|---|---|---|---|---|---|---|
| 4 | Levels to Explode = 5 | | | | | | | | |
| 5 | Implemented Only = Yes | | | | | | | | |
| 6 | Display Option = Current | | | | | | | | |
| 7 | Description = ASY,WIC,Ethernet, boom | | | | | | | | |
| 8 | | | | | | | | | |
| 9 | Component | Risk Rat | Lead Time | Voltage | Refresh | Description | Qty | Rev | Manufact. |
| 10 | 471-00015-01 | 0 | 0 | n/a | n/a | LBL,BLANK,800-LEVEL PN BARCODE,PCBA | 1 | B2 | BAY AREA LABELS |
| 11 | | | | | | LBL,BLANK,800-LEVEL PN BARCODE,PCBA | 1 | B2 | BRADLEY NAMEPLATE |
| 12 | | | | | | LBL,BLANK,800-LEVEL PN BARCODE,PCBA | 1 | B2 | BRADY |
| 13 | | | | | | LBL,BLANK,800-LEVEL PN BARCODE,PCBA | 1 | B2 | CELLOTAPE |
| 14 | | | | | | LBL,BLANK,800-LEVEL PN BARCODE,PCBA | 1 | B2 | DONPRINT WORLDMARK-SCOTLAND |
| 15 | | | | | | LBL,BLANK,800-LEVEL PN BARCODE,PCBA | 1 | B2 | SUPER ENTERPRISE (PENANG) |
| 16 | | | | | | LBL,BLANK,800-LEVEL PN BARCODE,PCBA | 1 | B2 | ZEPHYR (PENANG) |
| 17 | 701806-0000 | 0 | 0 | n/a | n/a | Mfg Ident/Serial/Label | 0 | C0 | - |
| 18 | 95-1276-03 | 0 | 0 | n/a | n/a | SPEC,800-LEVEL PN BARCODE,PCBA | 1 | E0 | - |
| 19 | 471-00027-01 | 0 | 0 | n/a | n/a | LBL,BLANK,COUNTRY OF ORIGIN | 1 | E0 | BAY AREA LABELS |
| 20 | | | | | | LBL,BLANK,COUNTRY OF ORIGIN | 1 | E0 | BRADLEY NAMEPLATE, CORP |
| 21 | | | | | | LBL,BLANK,COUNTRY OF ORIGIN | 1 | E0 | DONPRINT WORLDMARK-SCOTLAND |
| 22 | | | | | | LBL,BLANK,COUNTRY OF ORIGIN | 1 | E0 | SHENZHEN ZHENFENG PRINTING |
| 23 | | | | | | LBL,BLANK,COUNTRY OF ORIGIN | 1 | E0 | SUPER ENTERPRISE (PENANG) |

SAP-output1 - WordPad

File  Edit  View  Insert  Format  Help

| Material | | | | | | | |
|---|---|---|---|---|---|---|---|
| J7230-60503 | | | | PANTHER PROC PERIPHERAL PCA TOP LEVEL | | Pint | Key date |
| | | | | | | GB01 | 19.05.2003 |
| BOM | | Use | Alt | Alternative text | | Base quantity  BUn | Valid from - to |
| 00032051 | | | 1 | | | 1.000  EA | 25.10.2001  31.12.9999 |

| Lv | Item | Component no. | | | | | |
|---|---|---|---|---|---|---|---|
| | | Description | | SortString | | Quant Un Fix | Valid from - To  Ext. |
| | | | | | | Ict OD Pha Asm | Change no. |
| 1 | 0000 | J7230-60503-4216  Panther Processor Peripheral PCA | | | | 1.000 EA | 06.05.2002 - 31.12.9999 |
| | | Panther Processor Peripheral PCA | | | | X | E02-S2747 |
| 2 | 0010 | A0380-1469 | | | | 4.000 EA | 06.05.2002 - 31.12.9999 |
| | | STANDOFF-PRESS-IN 8-MM-LG M3.0 X 0.5-THD | | | | L | |
| 2 | 0020 | A0570-1323 | | | | 4.000 EA | 06.05.2002 - 31.12.9999 |
| | | STD-PRS-IN MS.5 X 0.45 10.000 PH-BRZ | | | | L | |
| 2 | 0030 | A1251-6429 | | | | 1.000 EA | 06.05.2002 - 31.12.9999 |
| | | CONN-POST TYPE .100-PIN-SPCG-MTG-END | | | | L | |
| 2 | 0040 | A1252-1994 | | | | 1.000 EA | |
| | | CONN-RECT | | | | L | |
| 2 | 0050 | A1252-7101 | | | | 1.000 EA | 06.05.2002 - 31.12.9999 |
| | | CONN-RECT USB 8-CKT 15-CONT | | | | L | |
| 2 | 0060 | A12527895 | | | | 1.000 EA | 06.05.2002 - 31.12.9999 |
| | | CONN-RECT D-SUBMIN 15-CKT 15-CONT | | | | L | |

For Help, press F1

FIG. 5

Complicated_oem - WordPad

File  Edit  View  Insert  Format  Help

Alternate: Primary                                                                 Revisions:

Components

| Level | Eng Item | Item | Op Seq | Seq | Alternate | Eng Bill | Item | Description | Planning Percent | Yield | Rev | Org | Supply Type | Item Type | Dept. | Where Used(*) | Supply Subinventory | UOM | Supply Locator | Effective Date | Disabl Date |
|---|---|---|---|---|---|---|---|---|---|---|---|---|---|---|---|---|---|---|---|---|---|
| 1 | No | | 10 | 1 | | No | 230-1166-01 | RELEASABLE TIE 50LB | 100.00 | 1.00 | A | 001 | Vendor | BUY-OEM | | 93 | | EA | | 12-JUN-00 | 20.0 M |

| Vendor Name | Vendor Item Number | | | | | | Status | | | | | Vendor Remarks |
|---|---|---|---|---|---|---|---|---|---|---|---|---|
| TYTON | RT50R | | | | | | Q | | | | | |
| CATAMOUNT | L-5-50R-9 | | | | | | Q | | | | | |

| 1 | No | | 20 | 1 | | No | 230-1536-01 | LEVELER, RACK | 100.00 | 1.00 | | 50 | Vendor | 001 BUY-OEM | | 6 | | EA | | 12-JUN-00 | 30.0 |

| Vendor Name | Vendor Item Number | | | | | | Status | | | | | Vendor Remarks |
|---|---|---|---|---|---|---|---|---|---|---|---|---|
| CALIFORNIA CASTER | IL8-12BMX4-SL2 | | | | | | T | | | | | |

For Help, press F1

FIG. 6

| | A | B | C | D | E | F | G | H | I |
|---|---|---|---|---|---|---|---|---|---|
| 1 | Item Number = 73-09311-03 | | | | | | | | |
| 2 | Organization = GLO(GLOBAL ORGANIZATION) | | | | "junk" | | | | |
| 3 | Revision = -A0 | | | | | | | | |
| 4 | Levels to Explode = 5 | | | | | | | | |
| 5 | Implemented Only = Yes | | | | | | | | |
| 6 | Display Option = Current | | | | | | | | |
| 7 | Description = ASY,WIC,Ethernet, boom | | | | | | | tabs | repeatable |
| 8 | | | | | | | | | |
| 9 | Component | Risk Rati | Lead Time | Voltage | Refresh | Description | | Qty Rev Manufact | |
| 10 | 471-00015-01 | 0 | 0 | n/a | n/a | LBL,BLANK,800-LEVEL PN BARCODE,PCBA | | 1 B2 | BAY AREA LABELS |
| 11 | | | | | | LBL,BLANK,800-LEVEL PN BARCODE,PCBA | | 1 B2 | BRADLEY NAMEPLATE |
| 12 | | | | | | LBL,BLANK,800-LEVEL PN BARCODE,PCBA | | 1 B2 | BRADY |
| 13 | | | | | | LBL,BLANK,800-LEVEL PN BARCODE,PCBA | | 1 B2 | CELLOTAPE |
| 14 | | | | | | LBL,BLANK,800-LEVEL PN BARCODE,PCBA | | 1 B2 | DONPRINT/WORLDMARK-SCOTLAN |
| 15 | | | | | | LBL,BLANK,800-LEVEL PN BARCODE,PCBA | | 1 B2 | SUPER ENTERPRISE (PENANG) |
| 16 | | | | | | LBL,BLANK,800-LEVEL PN BARCODE,PCBA | | 1 B2 | ZEPHYR (PENANG) |
| 17 | 701806-0000 | 0 | 0 | n/a | n/a | mfg Ident./Serial/Label | | 0 C0 | - |
| 18 | 95-1276-03 | 0 | 0 | n/a | n/a | SPEC,800-LEVEL PN BARCODE LABEL,PCBA | | 1 A0 | - |
| 19 | 471-00027-01 | 0 | 0 | n/a | n/a | LBL,BLANK,COUNTRY OF ORIGIN | | 1 E0 | BAY AREA LABELS |
| 20 | | | | | | LBL,BLANK,COUNTRY OF ORIGIN | | 1 E0 | BRADLEY NAMEPLATE, CORP. |

73-09311-03 / 73-04796-01 ← Block

FIG. 7 agile Prod

Welcome Seed User

| Administration | Security | UI Setup | Parser Admin | Component Management | Agile Import |

| Search | Test | Parse | Parse | Test | Record | Convert | Export | Import |
| Profiles | Recogniton | | ROM and AML | Regular Expression | Maintenance | File Type | Profile | Profile |

Create Parser Profile

Fields with * are required

*Parser Profile Name [AGILE_TEST_1]

[Save]

Configure File Attributes

| * | Attribute Name | | Attribute Value |
| [Add] | * | [Select ▶] | [▶] |
| | ☐ Edit Delimiter | | TAB |
| [Delete Selected] | | | |

FIG. 8

▲ All file type conversions done to text prior to processing
▲ Can have multiple steps to "massage" data
  △ Exploding one column to multiple fields
  △ Can be extended to apply any preprocessing to data
    Conversion engine
    - Custom conversion
    - conventional conversions
    [Text → HTML; PDF → Text → Spreadsheet (Excel); etc.]

Select Advanced Options

| * | *Module Name | ▶ | *Sequence | |
|---|---|---|---|---|
| Add | Select | | | |
| ☐ | Edit com.onerev.pm.standardize.preprocessor.ExceltoTxtConverter | | 2 | Details |

FIG. 9

- Objective: Dynamically pick the configured profile

- Establish string patterns to identify file type
  △ Unique in the profile bank
  △ First matched pattern is used for profile selection

*Pattern Type: Select

*Line Pattern

Add

☐ Edit Recognition Line

Component Risk Rating lead Time Voltage Refresh Description Qty Rev manufact. Mfr Part No. Ref Desg. WIP supply buyer Cost Status Impl Status Mfg. EOL Date SF_CR_NW CR Qual Sole Source

→ a. Repeatable Block
→ b. Fixed Width
→ Junk Data

| Material | RevLev | Description | | Pint | Key date |
|---|---|---|---|---|---|
| J7230-60503 | | PANTHER PROC PERIPHERAL PCA TOP LEVEL | | GB01 | 19.05.2003 |
| BOM | Use Alt | Alternative text | | Base quantity BUn | Valid from - to |
| 00032051 | 1 | | | 1.000 EA | 25.10.2001 31.12.9999 |

| Lv | Item | Component no. Description | SortString | Quant Un Fix Ict OD Pha Asm | Valid from - To Change no. Ext. |
|---|---|---|---|---|---|
| 1 | 0040 | J7230-60503-4216 Panther Processor | Peripheral PCA | 1.000 EA L | 06.05.2002 - 31.12.9999 E02-S2747 |
| 1 | 0000 | J7230-60503-4216 | Panther Processor Peripheral PCA | | |
| 2 | 0010 | A0380-1469 STANDOFF-PRESS-IN 8-MM-LG M3.0 X 0.5-THD | | 4.000 EA L | 06.05.2002 - 31.12.9999 |
| 2 | 0020 | A0570-1323 STD-PRS-IN MS.5 X 0.45 10.000 PH-BRZ | | 4.000 EA L | 06.05.2002 - 31.12.9999 |
| 2 | 0030 | A1251-6429 CONN-POST TYPE .100-PIN-SPCG-MTG-END | | 1.000 EA L | 06.05.2002 - 31.12.9999 |
| 2 | 0040 | A1252-1994 CONN-RECT | | 1.000 EA L | 06.05.2002 - 31.12.9999 |

→ TLA (J7230-60503)

FIG. 14

- ▲ Objective: Dynamically pick the configured profile
- ▲ Establish string patterns to identify file type
  - △ Unique in the profile bank
  - △ First matched pattern is used for profile selection

| *Pattern Type | *Line Pattern |
|---|---|
| Select ▶ | Lv Item Component no. SortStrng Quant Un Fix Valid from - To | |

[ * ] [ Add ]

☐ Edit Recognition Line

Configure File Attributes

| Attribute Name | Attribute Value |
|---|---|
| Select... ▶ | BOM ▶ |

[ * ] [ * ] [ Add ]

☐ Edit File Type

[ Delete Selected ]

- ▲ File Type = BOM

| Material<br>J7230-60503 | RevLev | Description<br>PANTHER PROC PERIPHERAL PCA TOP LEVEL | | Pint<br>GB01 | | |
|---|---|---|---|---|---|---|
| BOM<br>00032051 | Use Alt<br>1 | Alternative text | | Base quantity<br>1.000 | BUn<br>EA | Valid from - to<br>25.10.2001 31... |
| Lv | Item Component no.<br>Description | | SortString | Quant Un Fix<br>Ict OD Pha Asm | | Valid from - To<br>Change no. |
| 1 | 0040 J7230-60503-4216<br>Panther Processor Peripheral PCA | | | 1.000 EA<br>L | X | 06.05.2002 - 31...<br>E02-S2747 |

*Pattern Type  [ Select... ▼ ]

[ * ]  [ Add ]   *Line Pattern

☐ Edit RecognitionLine      Lv Item Component no. SortStrng Quant Un fix Valid from - To |
☑ Edit SkipLine              Lv Item Component no. SortStrng Quant Un fix Valid from - To |
☑ Edit SkipLine              |
☑ Edit SkipLine              |Material RevLev Description Plnt Key date |
☑ Edit SkipLine              |BOM Use Alt Alternative text Base quantity BUn Valid from - to |
☑ Edit SkipLine              |Description Ict OD Pha Asm Change no. Ex. |

☐ Edit SkipRegExpLine        ^(\|\d+\s+\d+\s+\d+\.0+\s+ EA \s+\d{2}\.\d{2}\s+\d{4}\s+\d{2}\.\d{2}\.\d{4}\|)
☐ Edit SkipRegExpLine        ^(\|\s+\d+\s+0+\s+\|,*)

FIG. 18

| Level | Eng Item | Item Seq | Op Seq | Alternate | Item | Eng Bill | Description | Rev | Org | Item Type | Planning Percent | Yield | Supply Type | Dept. | Where Used(*) Supply Subinventory | Supply Locator |
|---|---|---|---|---|---|---|---|---|---|---|---|---|---|---|---|---|
| 1 | No | 10 | 1 | | 230-1166-01 | No | RELEASABLE TIE 50LB | A | 001 | BUY-OEM | 100.00 | 1.00 | Vendor | | 93 | |

| Vendor Name | Vendor Item Number | Status |
|---|---|---|
| TYTON | RT50R | Q |
| CATAMOUNT | L-5-50R-9 | Q |

| 1 | No | 20 | 1 | | 230-1536-01 | No | LEVELER, RACK | | 50 | 001 BUY-OEM | 100.00 | 1.00 | Vendor | | 6 |

→ Nested Block

→ Block

FIG. 20

Alias Matches | Alias No Match

Map MSL Standard Mfr

Project Id : MSL-2644
Program : Test

No of Records Per Page: [All ▼]

Alias 1 - 8 of 8 | Page [1 ▼] of 1   [< Prev] [Next >]

| Customer Standard Mfr | MSL Standard Mfr | Remarks | Action |
|---|---|---|---|
| ANALOG DEVICES | ANALOG DEVICES INC | | Edit |
| ATMEL | ATMEL 2 | | Edit |
| FAIRCHILD SEMICONDUCTOR | FAIRCHILD SEMICONDUCTOR | | Edit |
| HITACHI ELECTRONIC COMPONENTS LTD. | HITACHI SEMICONDUCTOR | | Edit |
| MAXIM JAPAN CO.LTD | MAXIM INTEGRATED PRODUCTS | | Edit |
| MICROCHIP TECHNOLOGY INC. | MICROCHIP TECHNOLOGY INC. | | Edit |
| PHILIPS TAIWAN LTD. | PHILIPS | | Edit |
| QUALITY SEMICONDUCTOR, INC. | QUALITY SEMICONDUCTOR, INC. | | Edit |

No of Records Per Page: [All ▼]

FIG. 24

Search and Map

Map 'ANALOG DEVICES' to Standard Mfr name

Mfr is [_____] [Get Standard Mfr Name]

[Please use '%' to display all results. Use '%' for wild-card search]

Suggested Standard Mfr Names to Map to

○ ANADIGICS INC
⊙ ANALOG DEVICES INC
○ ANALOG MICROELECTRONICS INC

Remark [_____]

[Map Selected]

Create and Map

Standard Mfr name is [ANALOG DEVICES]

Remark [_____]

[< Prev]  [Create and Map]

FIG. 25

Welcome John Doe  Profile  Logout

Dashboard | Component Management

Agile Product Interchange

Map PartMiner Standard Mfr

Project Id : MSL-2644
Program : Test

Alias Matches | Alias No Match

Alias 1 - 8 of 8 | Page [1 ▼] of 1  [< Prev] [Next >]

No of Records Per Page: [All ▼]

| MSL Standard Mfr | PartMiner Standard Mfr | Remarks | Action |
|---|---|---|---|
| ANALOG DEVICES INC | Analog Devices Inc | | Edit |
| FAIRCHILD SEMICONDUCTOR | Fairchild Semiconductor Corp | | Edit |
| MAXIM INTEGRATED PRODUCTS | Maxim Integrated Products Inc | | Edit |
| MICROCHIP TECHNOLOGY INC. | Microchip Technology Inc. | | Edit |
| PHILIPS | Philips Semiconductor | | Edit |
| QUALITY SEMICONDUCTOR INC | Quality Semiconductor Inc | | Edit |

No of Records Per Page: [All ▼]

FIG. 26

Welcome John Doe                         Profile   Logout

Dashboard | Component Management

Part Alias Match Results

Project Id : MSL-2644
Program : Test

View: Exact Matches | No Match

No of Records Per Page: All ▸          Exact Matches 1 - 10 of 10 | Page 1 ▸ of 1     Save   Next >

| | Customer IPN | Customer MFR | Customer MPN | Alias MFR | Alias MPN |
|---|---|---|---|---|---|
| ☐ | AL001617W16 | ANALOG DEVICES INC | ADM1021AARQ | Analog Devices Inc | ADM1021AARQ |
| ☐ | AL003257W25 | FAIRCHILD SEMICONDUCTOR | FST3257QSCX | Fairchild Semiconductor Corp | FST3257QSCX |
| ☐ | AL000893015 | MAXIM INTEGRATED PRODUCTS | MAX890LESA-T | Maxim Integrated Products Inc | MAX890LESA-T |
| ☐ | AKE1A100E08 | MICROCHIP TECHNOLOGY INC. | 24LCO2B/SN | Microchip Technology Inc. | 24LCO2B/SN |
| ☐ | AL001617W16 | PHILIPS | NE1617ADS | Philips Semiconductor | NE1617A |
| ☐ | AL007W14C00 | PHILIPS | 74HC2G14GW | Philips Semiconductor | 74HC2G125DP |
| ☐ | AL01G125C00 | PHILIPS | 74AHCT1G125GW | Philips Semiconductor | 74AHCT1G125GW |

FIG. 29

Select / Modify Validation Rules

Missing Info: BOM:
- ☑ Missing Level
- ☑ Missing Part Number
- ☑ Missing Quantity
- ☑ Missing UOM
- ☑ Missing Description
- ☑ Missing Reference Designators Select All - Clear All Discrepancies: BOM:
- ☑ Qty <> Number of Reference Designators
- ☑ Invalid Quantity
- ☑ Duplicate Part Number
- ☑ Part Number with Multiple Descriptions
- ☑ Duplicate Reference Designators
- ☑ Parent and Child Part Numbers are Identical
- ☑ Unusual Characters in Part Number Select All - Clear All Missing Info: AML:
- ☑ Missing Manufacturer Part Number
- ☑ Missing Manufacturer Name

Welcome John Doe

Dashboard | Component Management

Create Recipe

Fields with * are required.

*Recipe Name [                    ]

Validate Rule:
☐ Manufacturer Part Number    ⊙ Exact Match    ○ Partial Match    ○ Alternate Match
☐ Mfr Name                    ⊙ Exact Match

*Data Source:
☐ PARTMINER

*Matching Rules:
☐ Neutralize [Removes dash, space from MPN before searching ]
☐ Remove [    ] characters in the Beginning
☐ Remove [    ] characters in the End

[ < Prev ]  [ Next > ]

FIG. 33

Agile Product Interchange

Welcome John Doe     Profile   Logout

Dashboard | Component Management

Project Id : MSL-2644
Program : Test

Re-Run | Change Recipe | Next >
Last Recipe Run: PARTMINER_MPN_PARTIAL

View: Selected Parts | Exact Matches | Near Matches | Alternate Matches | No Matches Near Matches No of Records Per Page: All ▼     Records 1 - 12 of 12 | Page 1 ▼ of 1

| | Customer IPN | Customer MFR ▲ | Customer MPN | Customer Part Description | Action |
|---|---|---|---|---|---|
| ☐ | AL001617W16 | ANALOG DEVICES INC | ADM1021AARQ | IC(16P) MAX1617A(QS... | ViewNear Matches |
| ☐ | AKE1A100E08 | ATMEL 2 | AT24C02A | IC EEPROM(8P,5V) NM... | ViewNear Matches |
| ☐ | AL003257W25 | FAIRCHILD SEMICONDUCTOR | FST3257QSCX | IC(16P) PI5C3257Q(Q... | ViewNear Matches |
| ☐ | AL000893015 | MAXIM INTEGRATED PRODUCTS | MAX890LESA-T | IC*8P) MAX893ESA(UM... | ViewNear Matches |
| ☐ | AKE1A100E08 | MICROCHIP TECHNOLOGY INC. | 24LCO2B/SN | IC EEPROM(8P,5V) NM... | ViewNear Matches |
| ☐ | AL01G125C00 | PHILIPS | 74AHCT1G125GW | IC(5P) SN74AHCT1G12... | ViewNear Matches |
| ☐ | AL007W14C00 | PHILIPS | 74HC2G14GW | IC(8P) TC7W14FU(SS... | ViewNear Matches |

FIG. 34

Agile Product Interchange

Welcome John Doe     Profile   Logout

Dashboard | Component Management

Update Near Match

| Customer MFR | Customer MPN | Customer Part Description |
|---|---|---|
| ANALOG DEVICES INC | ADM1021AARQ | IC(16P) MAX1617A(QSOP) |

Select Near Match (ADM1021AARQ)

| Select | Source MFR | Source MPN | Source Lifecycle Status | Source |
|---|---|---|---|---|
| ○ | Analog Devices Inc | ADM1021AARQ | ACTIVE | PARTMINER |
| ⊙ | Analog Devices Inc | ADM1021AARQ-REEL | ACTIVE | PARTMINER |
| ○ | Analog Devices Inc | ADM1021ARQ | ACTIVE | PARTMINER |

[< Prev]  [Move to No-Match]  [Next >]

FIG. 35

- Capabilities:
  - Automated enrichment with multiple attributes, from multiple sources
    - Lifecycle status, LTB, LTD, EOL, Category ID, part description, parametric data
    - Datasheets, Multi-source profile
    - Lead time, Availability, Breadth of Usage
    - Inventory, Usage, Preferred Status
- Benefits:
  - Brings together all available Component Intelligence to drive optimal parts selection and decision making
    - Leads to reduced scrap & inventory
    - Fewer Lifetime / Expedited buys
    - Reduced risk of forced product redesign

FIG. 37

| | | | | | | |
|---|---|---|---|---|---|---|
| ☐ | Customer IPN | Customer MFR | Customer MPN | Description | Commodity Group | Commodity Code |
| ☐ | DA0TM7MBAJ5 | HITACHI SEMICONDUCTOR | TM7(DA0TM7MBAJ5 REVJ) | PCB TM7 MB(10L,30... | | Select ▶ |
| ☐ | | TEXT INSTRUMENTS | TM7(DA0TM7MBAJ5 REVJ) | PCB TM7 MB(10L,30... | | Select ▶ |
| ☐ | AL000893015 | MAXIM INTEGRATED PRODUCTS | MAX890LESA-T | IC(8P) MAX893ESA(U... | | Select ▶ |

FIG. 40 — Screenshot of browser window showing "Update Data Source Profile" form.

File Edit View Favorites Tools Help

Address: https://63.74.131.157/orexec/DataSource.fma?dataSourceId=172

Tabs: Create | Profile | Source Profile | Alias Search | Search

Update Data Source Profile
Fields with * are required.

- *Name: CPNDB
- *URL: jdbc:oracle:thin:@PI-DEMO:1521:agil
- *User Name: piuser
- *Password: ********
- Driver: oracle.jdbc.driver.OracleDriver
- *Match Record Limits: 7
- Accounts:
- *Source Type: REFERENCE_PRIMARY
- *Organization: MSL
- SQL:

(Max size: 1024 char)

FIG. 43

Parser Admin | Component Management | Agile Import

MSL
| Mfrs |
Bulk
Load

Update Data Source Profile
Fields with * are required.

- *Name: CPNDB
- *URL: jdbc:oracle:thin:@QATEST01:1521:demo
- *User Name: piuser
- *Password: ********
- Driver: oracle.jdbc.driver.OracleDriver
- Accounts:
- *Match Record Limits: 7
- *Source Type: REFERENCE_PRIMARY ▼
- *Organization: Zephyr ▼

| File | Edit | View | Favorites | Tools | Help | | | | | | □ □ ⊠ |
|---|---|---|---|---|---|---|---|---|---|---|---|

Address: https://qatest01/orexec/MPNMatchResults.fma?parseStatus=1  ▶ ▶Go

Search Web ▶ ◇ PageRank 🗗 80 Blocked 🗐 AutoFill 🖪 ☐ Options

Exact Matches

[ Change Recipe ] [ Export PDX ] [ Export BOM/AML ] [ Export MPN Mapping ] [ Save ] [ Next > ]

View: Selected Parts | Exact Matches | Near Matches | Alternate Matches | No Matches      Last Recipe Run: PARTMINER_MPN_EXACT No of Records Per Page: [All ▼]      MPNs 1 - 8 of 8 | Page [1 ▼] of 1
Select All - Clear All

| ☐ | Select | Customer IPN | Customer MFR | Customer MPN | Customer Part Description | Lifecycle Status | Last Buy Date | Last Ship Date | Commodity Code | Source |
|---|---|---|---|---|---|---|---|---|---|---|
| ☐ | | AL001617W16 | ANALOG DEVICES | ADM1021AARQ | | | | | | |
| ☐ | ○ | | Analog Devices Inc | ADM1021AARQ | IC,DATA ACQ SYSTE... | ACTIVE | | | 3750 | PARTMINE |
| ☐ | | AL003257W25 | FAIRCHILD SEMICONDUCTOR | FST3257QSCX | | | | | | |
| ☐ | ○ | | Fairchild Semiconductor Corp | FST3257QSCX | IC,LOGIC MUX,QUAD... | ACTIVE | | | 4390 | PARTMINE |
| ☐ | | AL000893015 | MAXIM JAPAN CO. LTD | MAX890LESA-T | | | | | | |

FIG. 48

Update MPN No-Match Alternates

| Customer MFR | Customer MPN | Customer Part Description |
|---|---|---|
| FAIRCHILD SEMICONDUCTOR | FST3257QSCX | IC(16P) PI5C3257Q(QSOP) |

Select MPN-Alternate Matches (FST3257QSCX)

| Source MFR | Source MPN | Source Lifecycle Status | Source | |
|---|---|---|---|---|
| Fairchild Semiconductor Corp | FST3257QSC | ACTIVE | PARTMINER | ☐ |
| Fairchild Semiconductor Corp | FSTU3257QSC | ACTIVE | PARTMINER | ☐ |
| Fairchild Semiconductor Corp | FSTU3257QSCX | ACTIVE | PARTMINER | ☐ |
| Integrated Device Technology Inc | IDT74FST3257Q | DISCONTINUED | PARTMINER | ☐ |
| Preicom Semiconductor Inc | PI5C3257Q | ACTIVE | PARTMINER | ☐ |
| Quality Semiconductor Inc | QS3257Q | DISCONTINUED | PARTMINER | ☐ |

[<Prev] [Save]

FIG. 49

SYSTEM AND METHOD FOR MANAGING ITEM INTERCHANGE AND IDENTIFICATION IN AN EXTENDED ENTERPRISE

RELATED APPLICATIONS

This application is a continuation of and claims priority to international application number PCT/US2004/029158, filed on Sep. 7, 2004, which claims the benefit under 35 U.S.C. §119(e) of provisional application No. 60/502,088, filed on Sep. 10, 2003.

BACKGROUND

In systems used for identifying items such as products and their components, it is important to accurately track them according to their evolving history, including product name changes, feature changes, manufacture and supplier changes, and other indicia used to identify individual products throughout time. As inter-corporate and inter-organization data exchange in PLM solutions (like Agile's) continues to grow, business processes are increasingly suffering from different standard names for organizations. For example, two companies may store the company name "Philips" as "Philips Ltd" and "Philips Semiconductor Ltd." Not having the ability to correctly understand the standard names for each organization reduces the ability of PLM solution like Agile to enable automated BOM cleansing for vendor names, and prevents correct part lookups, this making the entire PLM process less efficient. This process is currently done manually in the industry.

With the rapid obsolescence of part numbers, EMS and OEM vendors invest a significant part of their resources to map "dirty" (obsolete, defective, NON-preferred) part numbers to relatively "clean" part numbers (active, low defect, preferred, etc.). Even with a high manual investment, not all parts in a given Bill of Material (BOM) get cleansed at the appropriate time, which leads to returning the BOM back to Designing at a relatively late stage in the production cycle, leading to expensive and often fatal delays. This process is currently done manually in the industry.

With the rapid obsolescence of part numbers, EMS and OEM vendors invest a significant part of their resources to map "dirty" (obsolete, defective, NON-preferred) part numbers to relatively "clean" part numbers (active, low defect, preferred, etc.). Many times, these vendors do not have all the information to correctly map the data, and have to rely on information provided by content partners like PartMiner, Silicon Expert to make the correct decision. This process is currently done manually, with Component Engineers visiting either the Manufacturer web sites, or going to the content partner web sites to get information on part-by-part basis, which is both expensive, and error prone, and very time consuming.

SUMMARY OF THE INVENTION

A system and method are provided for managing item record interchange in a business enterprise, where an item may be a product, component part, partially assembled or manufactured part, a process, or other item that requires indicia used to identify it within a business enterprise, whether it is a single company enterprise, or a widespread business that receives items from other sources such as manufacturers, suppliers, purchasers, shippers, or other entities. The system provides a universal solution that allows the intake of item records, such as records for manufacturer component parts shipped to a product manufacturer, and integrating the part records from disparate sources into a standard and useable format. The system allows a user or enterprise to receive records related to an item, and identify indicia identifying an item, such as component part names or numbers, or by manufacturer, supplier, purchaser or assembler name, and translating the item indicia into standard system indicia. Then, alias names or numbers can be established for items. If used in the system before, the system can update alias indicia for an item. And, benefiting from the history of item records in the system, the system can perform edits on the indicia to update the item information in the system, cleansing old records or information so that items can be properly and efficiently identified. Incoming items can be validated and their item indicia enriched in the system by executing validation rules having commands that define the manner in which item information is validated. Thus, a cleansing module may be configured to update the item indicia. An enriching module may be configured to add new item indicia based on additional intelligence known about the item in the enterprise, obviating obsolete and outdated records related to an item.

Within the system, the invention provides a system and method for translating item identification indicia. The method may include first identifying an item record that has indicia for identifying an item. The indicia may include the item's name, manufacturer, supplier, assembler or purchaser, or other indicia identifying the item. If the item is related to other items in the system, or if the same or similar item has been processed in the system, the new system would leverage the item's history and establish one or several levels of alias indicia for an item. The system may perform edits on the indicia to update the item information. The system may execute validation rules, where a validation module has commands that define the manner in which item information is validated. For complete handling of items, the system may be further configured to perform exception handling in an interactive manner.

A system for establishing aliasing to identify an item may include an item intake module configured to receive item records, an identifying module configured to identify the item according to indicia within the item's records, and an aliasing module configured to automatically convert item name variants into predetermined alias indicia. A system may further include a validation module having validation rules with commands that define the manner in which item indicia is validated. The system may further include a item record translator for managing item information and configured to automatically convert a item indicia into predetermined indicia, and an interactive framework configured to manage exceptions related to an item and routing of item information.

The invention further provides a system and method configured to cleanse a item record. Cleansing serves to standardize item names to improve sourcing and inventory consolidation. The system includes a part number aliasing module configured to automatically convert item indicia, such as part numbers from a manufacturer for example, originating from separate sources to alternate indicia. An item knowledge base configured to store item information related to items allows the system to leverage historical and updated information on an item to help properly identify an item in a system. A method for cleansing an item record helps to standardize item names to improve sourcing and inventory consolidation. Such a method would look up a standard item indicia according to a standard indicia data base, and possibly converting the indicia to standard indicia for the item. If, for example, an item is a manufactured part, the method is configured to convert a first manufacturer name to a standard manufacturer name. The system would then map standard manufacturer name to a reference source manufacturer name, then search for an alias for the first manufacturer name. Then, a name alias may be selected to replace the first manufacturer name. The method may then map the manufacturer and customer part numbers to preferred part numbers by mapping the first alias name with another alias name.

The system further provides a method for validating an item record by use of templates. Such a method may include first looking up a standard item indicia according to the item record in a data base. If there is a history of the item, then the system can automatically generate a part matching template. The method may further include analyzing indicia matching results from the database, and selecting the item information template that is most near matching results. Validation consists on running a sequence of "smart" rules to verify the integrity of the indica. The validation rules include checking the BOM/AML structural integrity, as well as the integrity of its attributes of item indicia, for example IPN and MPN parts.

The system may still further include a system and method for enriching item indicia. If the item is new in the system, the method may include first assigning a commodity code, and creating a new data source profile. An enrichment module may then automatically assigning one or more attributes to a part according to universal component intelligence stored in the database. The system may then search data source profiles by a data source identifier and a data source name. The system may include a component intelligence module configured to gather information indicia for components and an enrichment module configured to match component indicia to the part.

THE FIGURES

FIGS. 4-13 are illustrations from a user-interface configured by a system such as FIG. 1 to illustrate the translation of a tab delimited file in a spreadsheet application and related novel methods;

FIGS. 14-19 illustrate a similar process for performing a translation with a record in a fixed width format;

FIG. 20 illustrates and GUI example of a complicated format, such as a nested block and how it is identified according to its location in the record;

FIGS. 24-29, are GUI illustrations that further record cleansing;

Figure 30A:
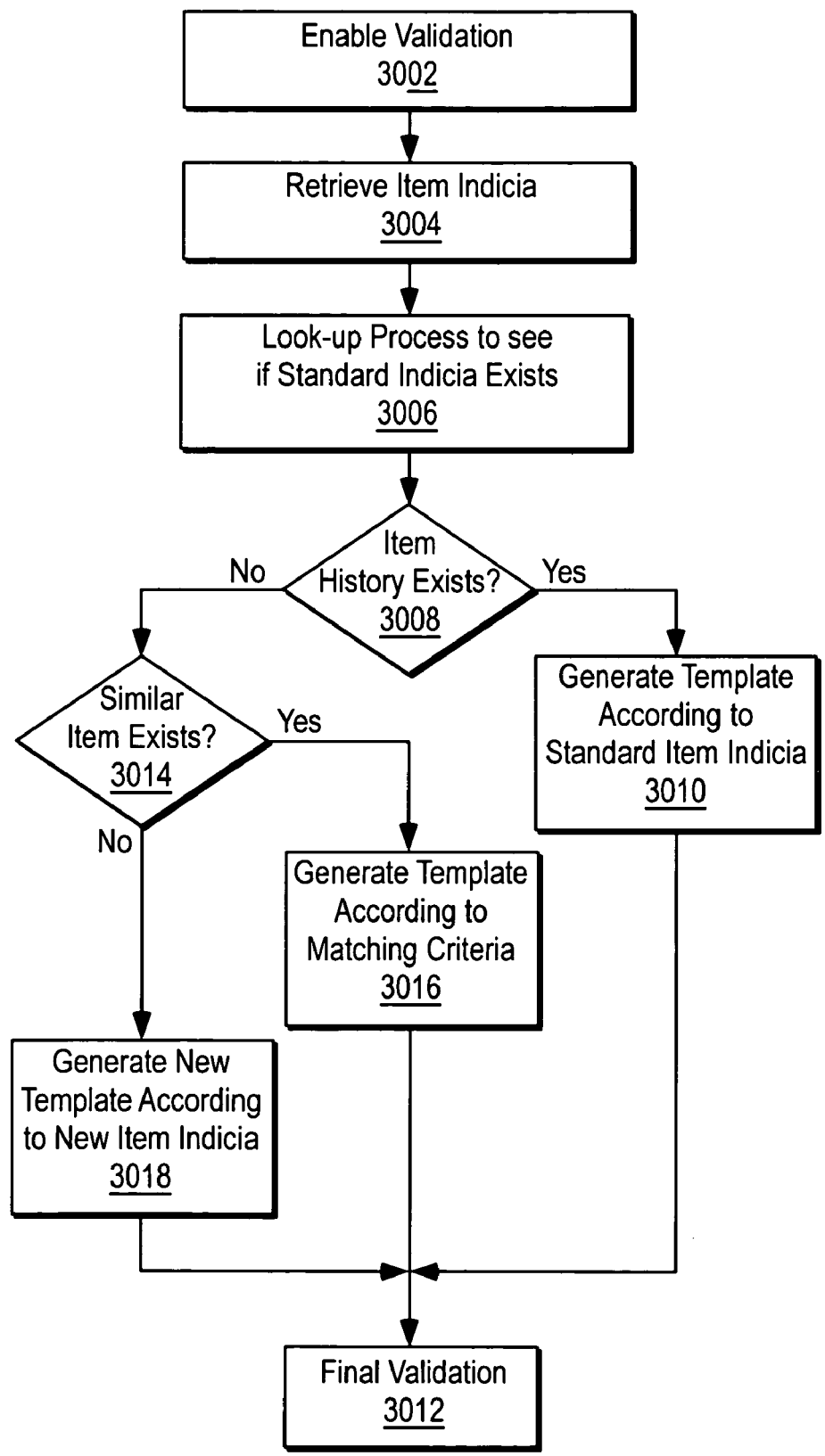
Figure 30B:
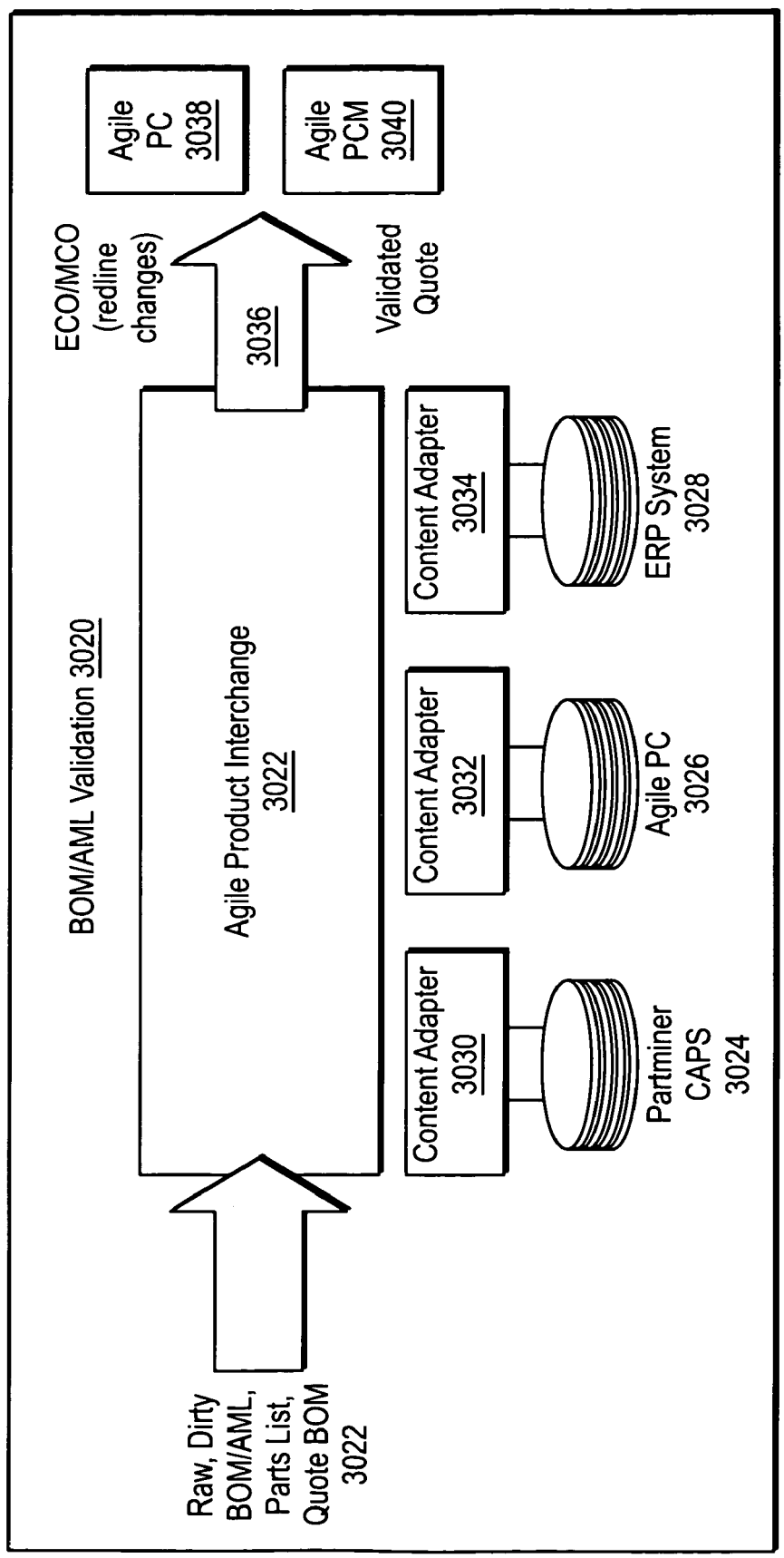
Figure 41:
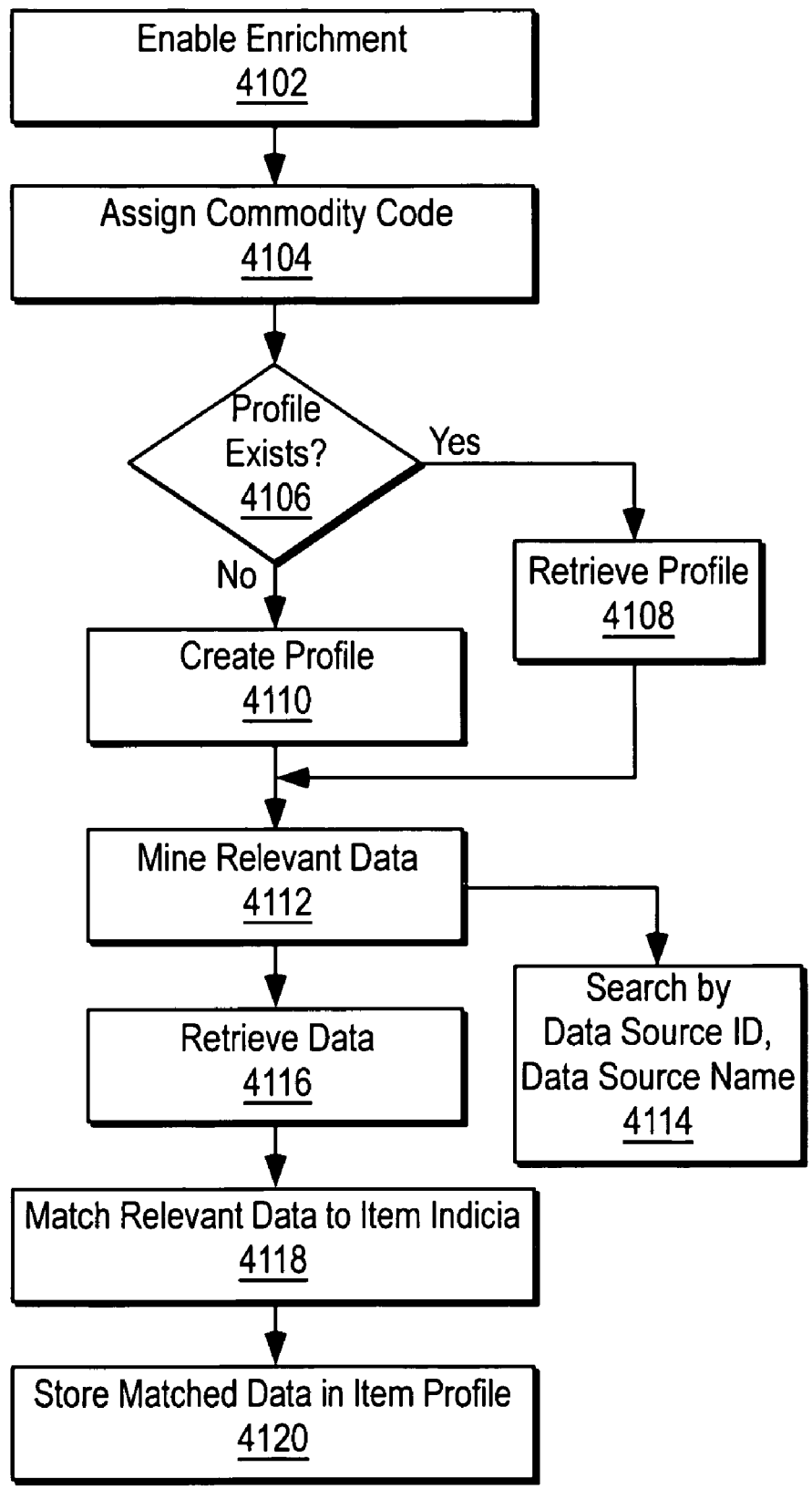

FIG. 30*a* is a flow chart of a method illustrating validation;

FIG. 30*b* is an illustration of a system of a method illustrating validation;

FIG. 31 illustrates examples of structural validation rules by way of a flow chart;

Figure 32:
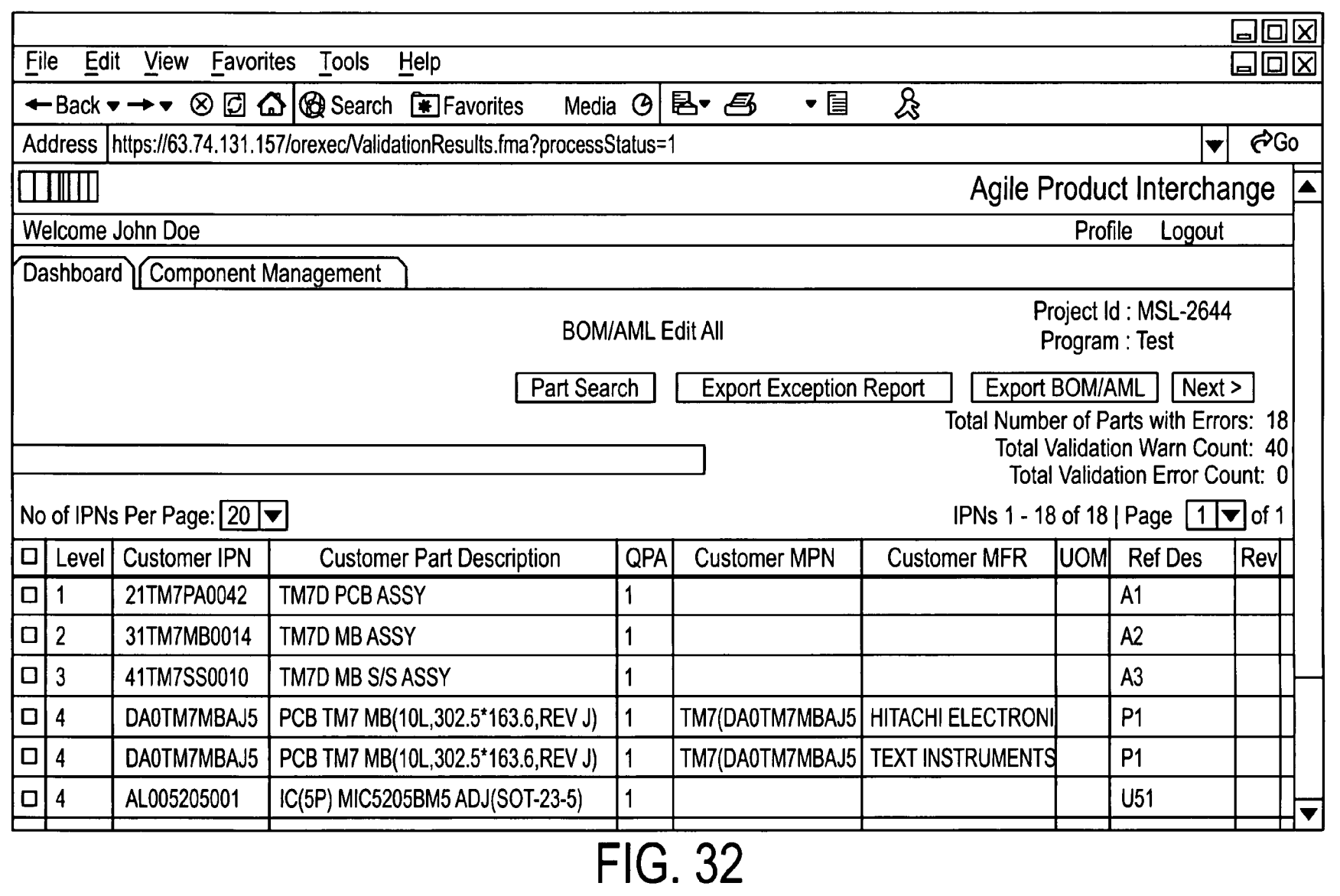

FIG. 32 illustrates an example of an interface to enable interactive exception handling;

FIGS. 33-36 illustrate user interfaces related to validation operations;

FIGS. 37-40 illustrate user interfaces related to enrichment operations;

FIG. 41 is a flow chart illustrating record enrichment; and

FIGS. 42-49 are user interfaces illustrating record enrichment.

DETAILED DESCRIPTION

The invention provides a system and method for managing item record interchange in a business enterprise, where an item may be a item, component part, partially assembled or manufactured part, a process, or other item that requires indicia used to identify it within a business enterprise, whether it is a single company enterprise, or a widespread business that receives items from other sources such as manufacturers, suppliers, purchasers, shippers, or other entities. The system provides a universal solution that allows the intake of item records, such as records for manufacturer component parts shipped to a product manufacturer, and integrating the part records from disparate sources into a standard and useable format. The system allows a user or enterprise to receive records related to an item, and identify indicia identifying an item, such as component part names or numbers, or by manufacturer, supplier, purchaser or assembler name, and translating the item indicia into standard system indicia. Then, alias names or numbers can be established for items. If used in the system before, the system can update alias indicia for an item. And, benefiting from the history of item records in the system, the system can perform edits on the indicia to update the item information in the system, cleansing old records or information so that items can be properly and efficiently identified. Incoming items can be validated and their item indicia enriched in the system by executing validation rules having commands that define the manner in which item information is validated. Thus, a cleansing module may be configured to update the item indicia. An enriching module may be configured to add new item indicia based on additional intelligence known about the item in the enterprise, obviating obsolete and outdated records related to an item.

A system for managing such an interchange in a business enterprise may include an item intake module configured to receive item records, which may include component parts, partially assembled parts, processes, processed items or other types of items that may come from suppliers, manufacturers, assemblers, purchasers, shippers or other sources of items. The system further includes an identifying module configured to identify the item according to indicia within the item's records send from the item's source. A translation module may then translate the item indicia variants into indicia that can be used by the system in integrating the item and its indicia. If the item has a history in the system, a cleansing module can update the item indicia, or, if no history exists, the item indicia can be recorded and established in the system for current and future recording of such items. The system may include a validation module configured to validate the item indicia, and an enriching module configured to improve item indicia based on additional intelligence known about the item in the enterprise.

Figure 1:
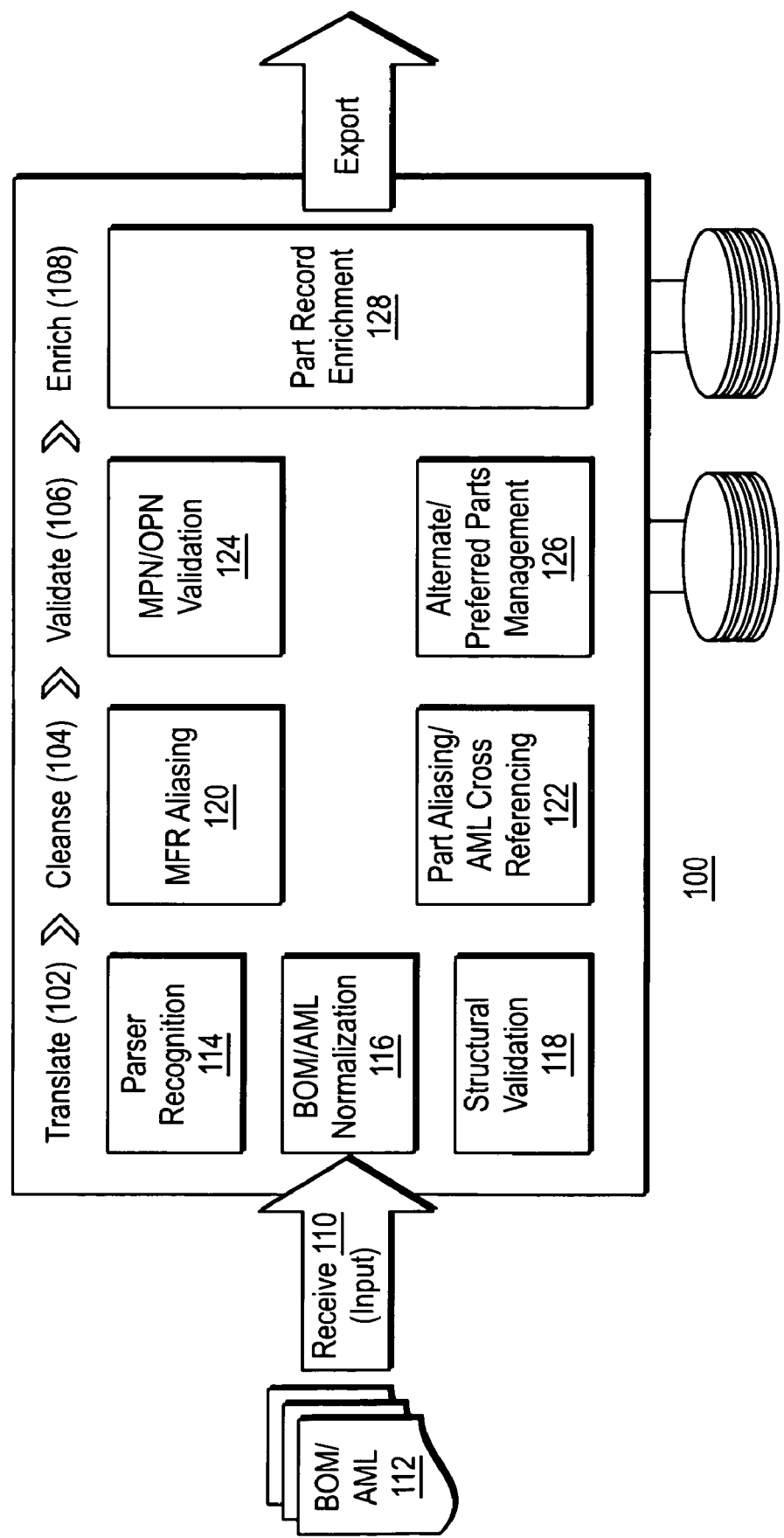
FIG. 1 is a block diagram of a system embodying the invention.

Referring to FIG. 1, a block diagram of a product interchange configured according to the invention is illustrated. Generally, the functional components include modules that translate 102, cleanse 104, validate 106 and enrich 108 record data 112 received at the input 110. Such input may take the form of records, such as a bill of materials (BOM), an approved manufacturers list (AML) 112, or other record source where items are provided that have indicia that identify the items, which, again, may include component parts, partially assembled parts, processed items, processes or other types of items that may come from suppliers, manufacturers, assemblers, purchasers, shippers or other sources of items.

The translate module includes a parser recognition module 114, that is configured to determine the type of parser, and thus, the type of parsing most useful and properly configured to parse out item indicia from the incoming records. Once parsed, the records are placed in a standard format that is normalized for subsequent use and processing in other product interchange modules.

The Cleanse module 104 further includes an aliasing module 120, indicated as a MFR (manufacturer) aliasing module as an example, that is configured to generate alias indicia, such as part numbers, for items in the incoming records. Cross referencing module 122, indicated as a part aliasing/AML (Approved Manufacturer List) cross referencing module here for example in a component part application, is configured to cross reference the alias indicia for an item with references of indicia from sources of items, such as manufacturers of parts for example. The validate module 106 includes a validation module 124 for validating item indicia that was cleansed in the cleanse module 104, which is indicated as a MPN (Manufacturer Part Number)/OPN (Other Part Number) for the component part application example. Alternate Preferred Parts Management module 126 is configured to provide specific management of alternative parts for use in the system. Finally, the enrichment module 128 is configured to enrich the item indicia by providing further enhancement to the item identification throughout the system.

Figure 2:
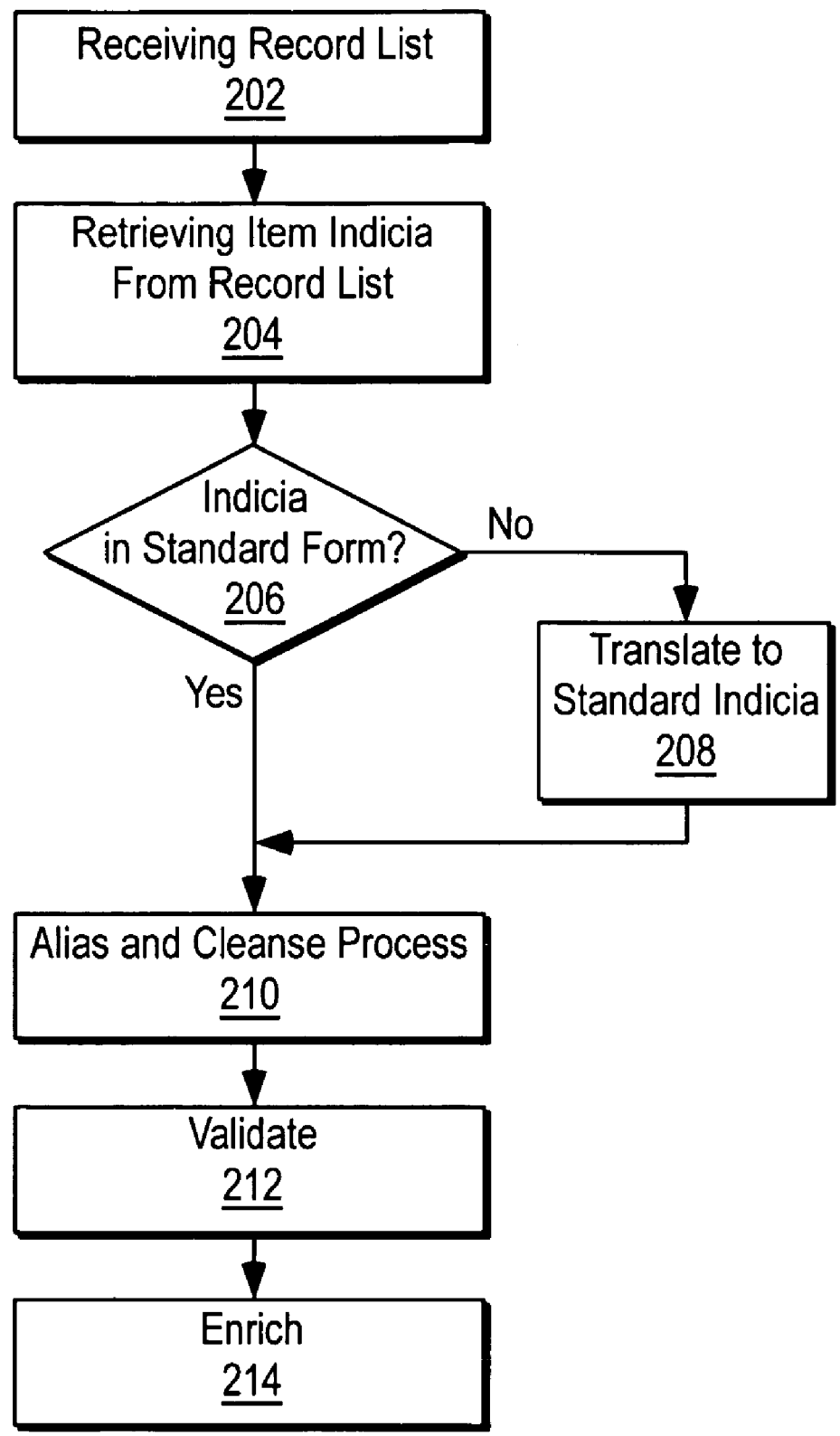
FIG. 2 is a flow chart for generally illustrating the function of a system such as FIG. 1.

FIG. 2 is a flow chart for generally illustrating the function of a system such as FIG. 1. In operation, the system receives a record list in step 202, and retrieving item indicia from the record list in step 204. The novel system then ensures standard treatment of indicia by determining in step 204 whether the indicia is in standard form. If it is not, then it is translated in step 208 to standard indicia. Such translation may be a format change to order the indicia into a proper and parseable format, or a record type change, such as from a text format to a graphics format, or other translations. The standardized records then proceed to step 210, where aliases are created and the item indicia is cleansed. The indicia is then cleansed in step 212, and enriched in step 214. These steps are discussed in further detail below.

As described further herein, other subsystems may exist in the system, and the methods may include detailed routines for perfecting such steps. The systems and methods described herein used in conjunction with the system of managing item identification and interchange within an enterprise system are novel in and of themselves. Some or all of the systems and methods may be used together for an excellent enterprise system. Alternatively, they may be separately incorporated into conventional systems to improve the interchange and/or identification of items within other systems. If used separately, they may be employed to improve many different types of systems, such as other enterprise interchange and identification systems, inventory tracking systems, shipping control systems, supply chain systems, and other systems that might benefit from such systems, subsystems and methods. The systems, subsystems and methods described herein are separately novel, and individually useable in and along with other systems and methods. Such separate use does not the scope of which is defined by the appended claims and all equivalents. It will be appreciated by those skilled in the art that the embodiments described are meant to be illustrative of the utility of the invention, and that the invention has greater applicability in other applications and embodiments.

A system and method are also provided for managing organization of item indicia, aliases, and other identifiers, which are useful for entities in acquiring items such as component parts, for mergers and acquisitions of items, assets and entities, and for many other applications. The invention enables the company and site names to be persisted and computed in a manner where aliasing information can be created to cleanse the names in an automated and efficient manner. The invention provides an automatic process for translating and validating a item identification history, or record, across an extended enterprise, which may include manufacturers, suppliers, assemblers and a range of different companies and organizations throughout a item's or a component's supply chain. This leverages dispersed content sources and ensures that all item record information is accurate and up to date. The novel improvement also allows for managing and organization aliases when companies merge or get acquired.

Within the system, the invention provides a system and method for translating item identification indicia. The method may include first identifying an item record that has indicia for identifying an item. The indicia may include the item's name, manufacturer, supplier, assembler or purchaser, or other indicia identifying the item. If the item is related to other items in the system, or if the same or similar item has been processed in the system, the new system would leverage the item's history and establish one or several levels of alias indicia for an item. The system may perform edits on the indicia to update the item information. The system may execute validation rules, where a validation module has commands that define the manner in which item information is validated. For complete handling of items, the system may be further configured to perform exception handling in an interactive manner.

A system for establishing aliasing to identify an item may include an item intake module configured to receive item records, an identifying module configured to identify the item according to indicia within the item's records, and an aliasing module configured to automatically convert item name variants into predetermined alias indicia. A system may further include a validation module having validation rules with commands that define the manner in which item indicia is validated. The system may further include a item record translator for managing item information and configured to automatically convert a item indicia into predetermined indicia, and an interactive framework configured to manage exceptions related to an item and routing of item information. Those skilled in the art will understand that conventional software code and related routines exist to implement this functionality, and the invention is not limited by such conventional technology, and will also understand that the description included herein is adequate to enable such implementation.

Figure 3:
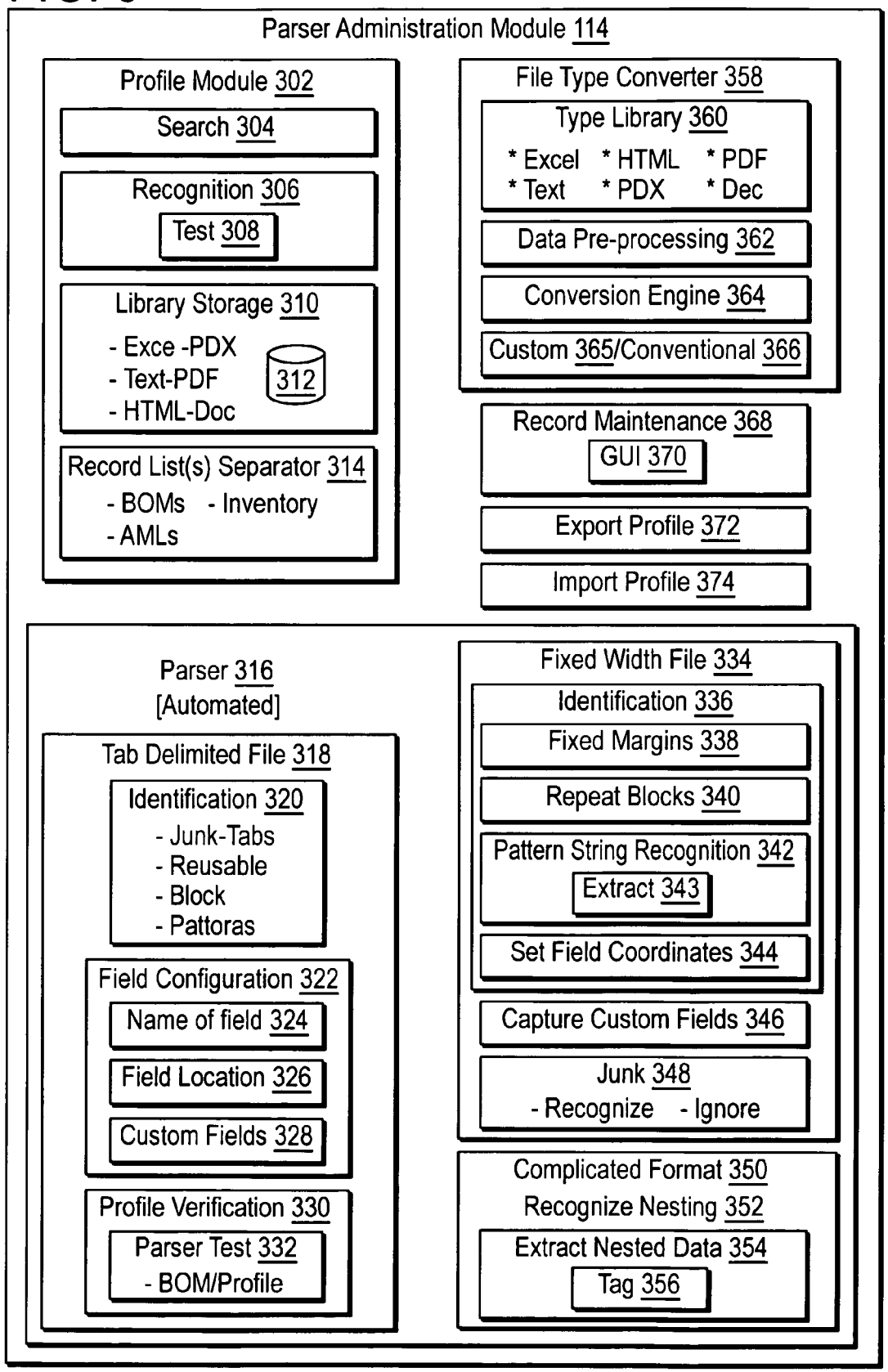
FIG. 3 is a more detailed block diagram of a Translate module 102 of FIG. 1.

FIG. 3 is a more detailed block diagram of a Translate module 102 of FIG. 1. The parser administration module 114 is configured to parse out item indicia from records received by a source, which provides items having identification indicia. The system, once configured, may operate automatically to properly parse out information from input records, and translating them into a workable form for later use and processing in the interchange system. In conventional operations, this process is handled manually using spreadsheets, such as Microsoft Excel™. Utilizing the invention, records can be parsed automatically and timely, preventing errors, lapses of deadlines, and other problems related to untimely changes and updates in item indicia and other information. As records are received, they may have certain profiles that can be recognized by the translation module, and can thus be properly parsed. The parser administration module includes a profile module 302 configured to detect such profiles. The profile module includes a search module 304 to allow for manual or possibly automatic searching of the profile forms. Such forms can be predetermined by a user, and can be formulated in a system. The recognition module 306 is configured to recognize the profile types that are embedded or otherwise incorporated or utilized in a record, and test module 308 is configured to test and see whether the profile recognized is the proper profile for reading and parsing from the record provided. Types of records may be stored in library storage 310, where different profile types may be stored, configured, and otherwise preserved for use in recognizing such profiles used in records received. The record list separator 314 is configured to separate different types of records, record lists, or other information that may be divisible, or that are better separated for meaningful use in the system. Some include Excel, text, HTML, PDX, PDF, doc and other types. For example, BOMs, AMLs or inventory lists may be used together or separately, and may be best separated out by the record list separator for meaningful or more efficient use.

The parser administration module further includes a parser 316, that can be configured to automatically parse out items indicia from records. The type of parser used depends on the format type or record type. Parser algorithms and engines are well known in the art, and the invention is not limited by such conventional parsers, embodiments may incorporate such known technology. Common types of record types include tab delimited files such as the example illustrated in FIG. 4, fixed width record illustrated in FIG. 5, and complicated multi-line wrap record format illustrated in FIG. 6.

Referring again to FIG. 3, the tab delimited file module 318 is configured to parse out files that are configured with tabs, such as spreadsheets, Microsoft Excel™ for example. Identification module 320 is configured to identify different fields in the file, such as junk (areas of data that is not useful for purposes of the product interchange operations), tabs themselves that identify certain information, reusable data blocks, certain identifiable blocks of information pertinent to items, and patterns of information that can be recognized by the system for parsing. Then, once the parser identifies the indicia, it can configure the field using the filed configuration module 322. The name of field module 324 is configured to name the field identified by the parser. The filed location module 326 can identify the field location in the record. Custom fields can be named and located in the custom field module 328, which can be configured by a user or system. Profile verification module 330 is configured to verify that profile that was parsed out, and parser tester is configured to test the profile to determine whether the process was property performed.

Still referring to FIG. 3, Parser 316 further includes a fixed width file module 334 configured to parse item data from a fixed width file. Fixed width file module 334 is configured to administer parsing of fixed width files. Identification module 334 is configured to identify locations and types of data that exist in such records. Fixed margins are typical of such records, and the fixed margin module 338 is configure to identify such fixed margins to allow parsing of data within such margins. Repeat blocks also are found in such records, and repeat blocks module 340 is configured to find and parse out such blocks. Pattern string recognition is important in fixed margin records, particularly since the fixed margins skew the shape of fields, requiring the identification of such strings for proper parsing. Pattern string recognition module 342 is configured to recognize and identify certain patterns in data strings, and can follow such strings along in a record and parse out the related data and extract out the data strings with extractor 343. Set field coordinates module 344 is configured to set the filed coordinates in the parsed out data, so that the data can be utilized in the interchange system. Capture custom fields module 346 is configured to capture fields that are not standard, and to enable the parsing out of information from such fields. Junk module 348 is configured to recognize and ignore information considered not useful by a system. Complicated format module 350 is configured to handle common complicated format records, such as those that involve information that is nested, or found within other fields, giving overlap of fields. Recognize nesting code 352 is configured to recognize such nested data, and extract nested data code 354 is configured to extracted the recognized data, and tag code 356 is configured to tag the data appropriately.

Those skilled in the art will understand that conventional software code and related routines exist to implement this functionality for different types of formats including tab delimited files, fixed width files and complicated format files described herein, as well as other types of record format files, and the invention is not limited by such conventional technology, and will also understand that the description included herein is adequate to enable such implementation.

Still referring to FIG. 3, it may be desired in some systems that certain file types may sometimes need to be converted to other file types. File type converter 358 is configured to convert one type of file to another. Type library 360 includes different types of files, where some common types include Excel, text, HTML, PDX, PDF, doc and other types. Data pre-processing code 362 is included to allow preprocessing of files prior to parsing, which may be preferred, since changes can propagate through other processing. Conversion engine 364 can include custom code 365 and conventional code 366 for converting different types of records.

The parser administration module may further include record maintenance module 368 for administration of records in the parser, such as graphical user interface (GUI) code 370 for managing the user interfaces for the system. Export profile code 372 and import profile code 374 are configured to export and import profiles respectively.

Figure 11:
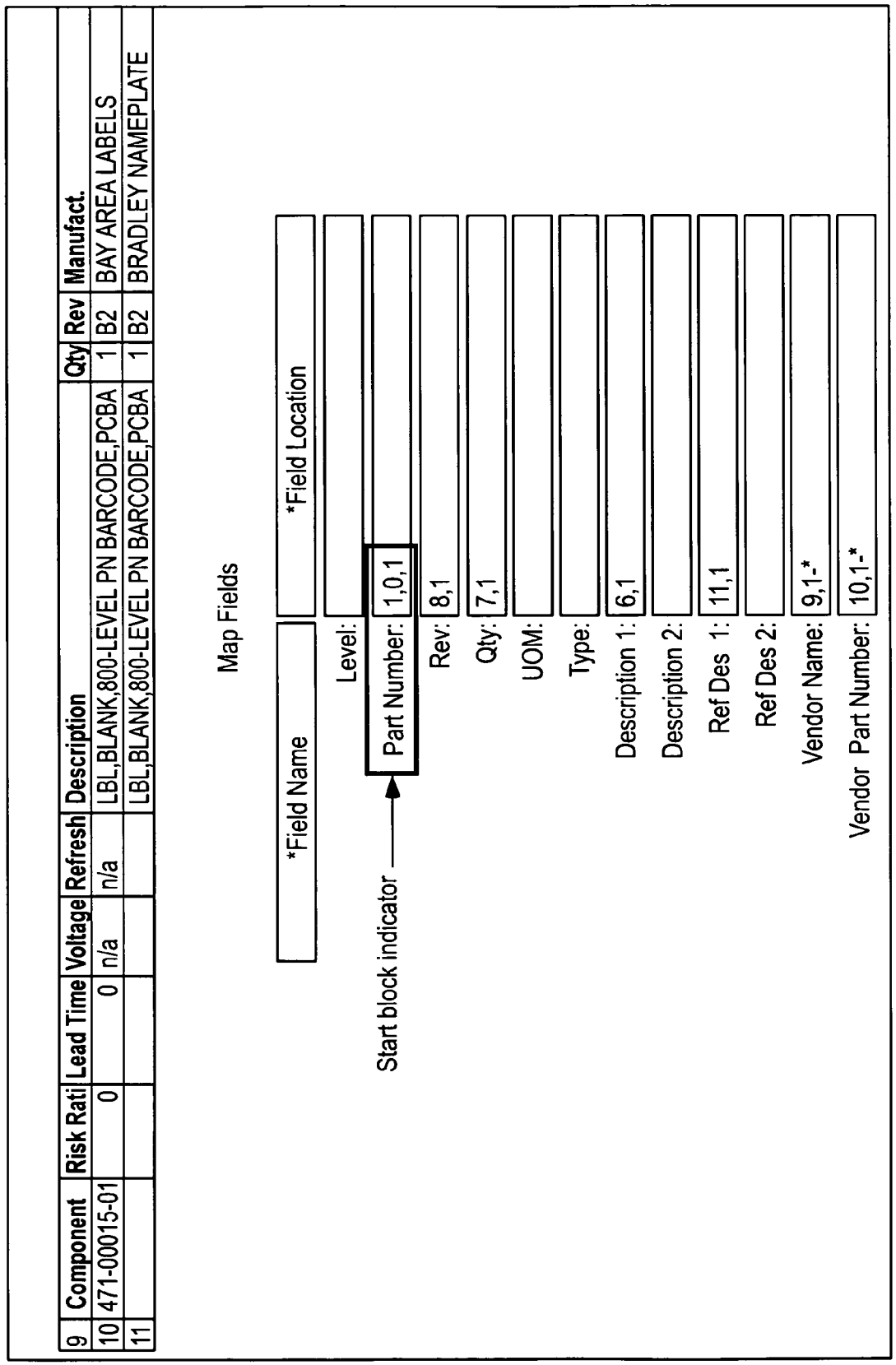
Figure 12:
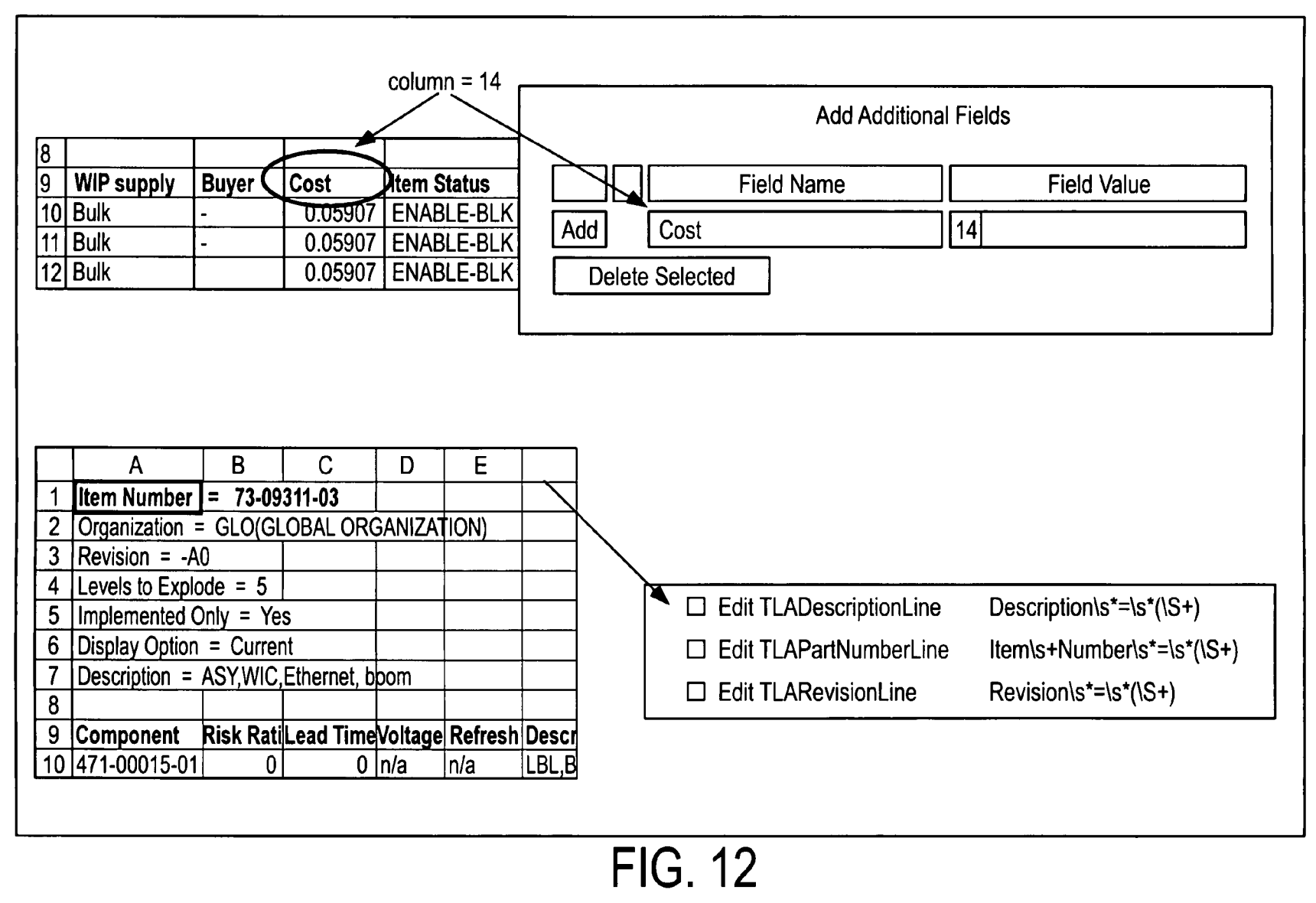
Figure 13:
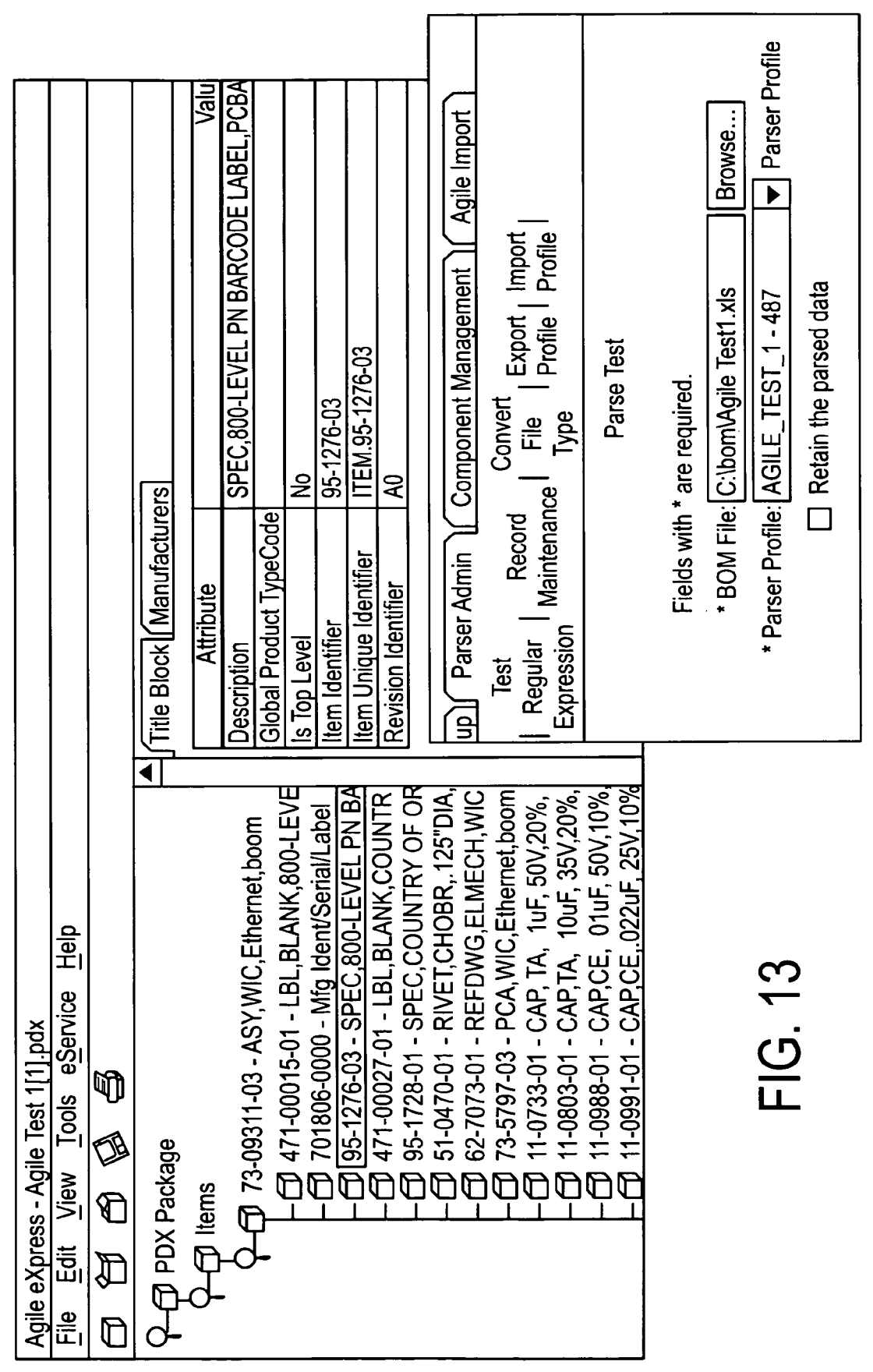

Referring to FIGS. 7-13, an example of the processing of translation on a tab delimited file is illustrated by use of an annotated user interface. The tab delimited BOM illustrated in FIG. 7 shows the "junk", "tabs", "block" and "repeatable" fields and related item information data typically found in such an item record. In FIG. 8 the parser administration module commands are illustrated in the Parser Admin tab of the user interface. In this area, parser administration may be configured for automatic parsing of information from records by the system. Here, a Parser Profile is created. FIG. 9 illustrates an example of a file type conversion, where a conversion engine (engine 364, FIG. 3) converts from one type to another. FIG. 10 is an illustration of setting a recognition pattern, where the configured profile may be dynamically chosen. To do this, string patterns are established to identify the file type, where they are distinguished in the profile bank. In operation, the first matched pattern is used for profile selection. Referring to FIG. 11, the fields are configured, here, for example, BOM and AML fields are configured. Referring to FIG. 13, custom fields are captured, as so configured by the system. For example, the cost column is captured in the field of "COST" and added as an additional field in this illustration. In FIG. 13, smart rules are used to verify the profile, and are implemented in the parse test.

Figure 16:
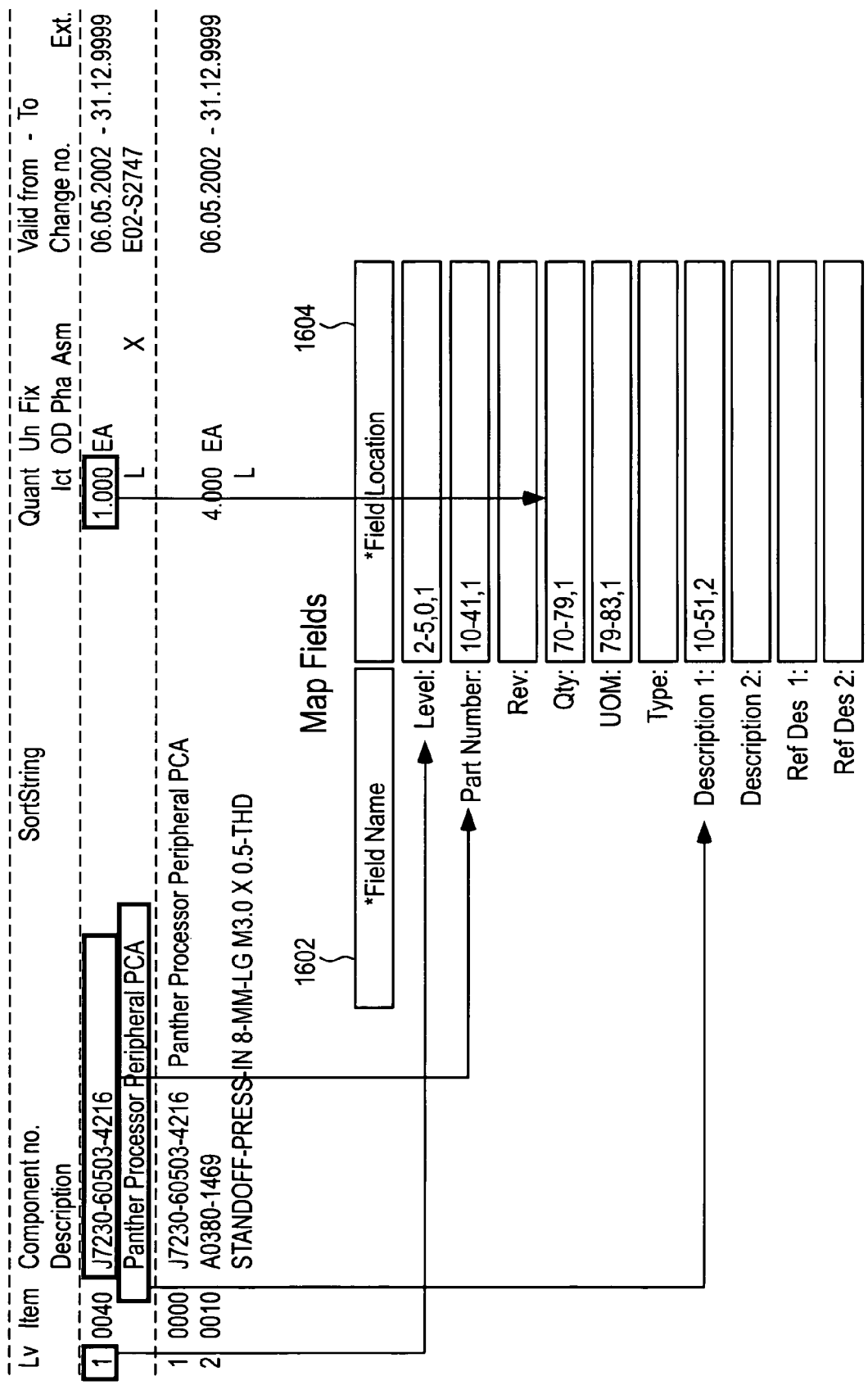
Figure 17:
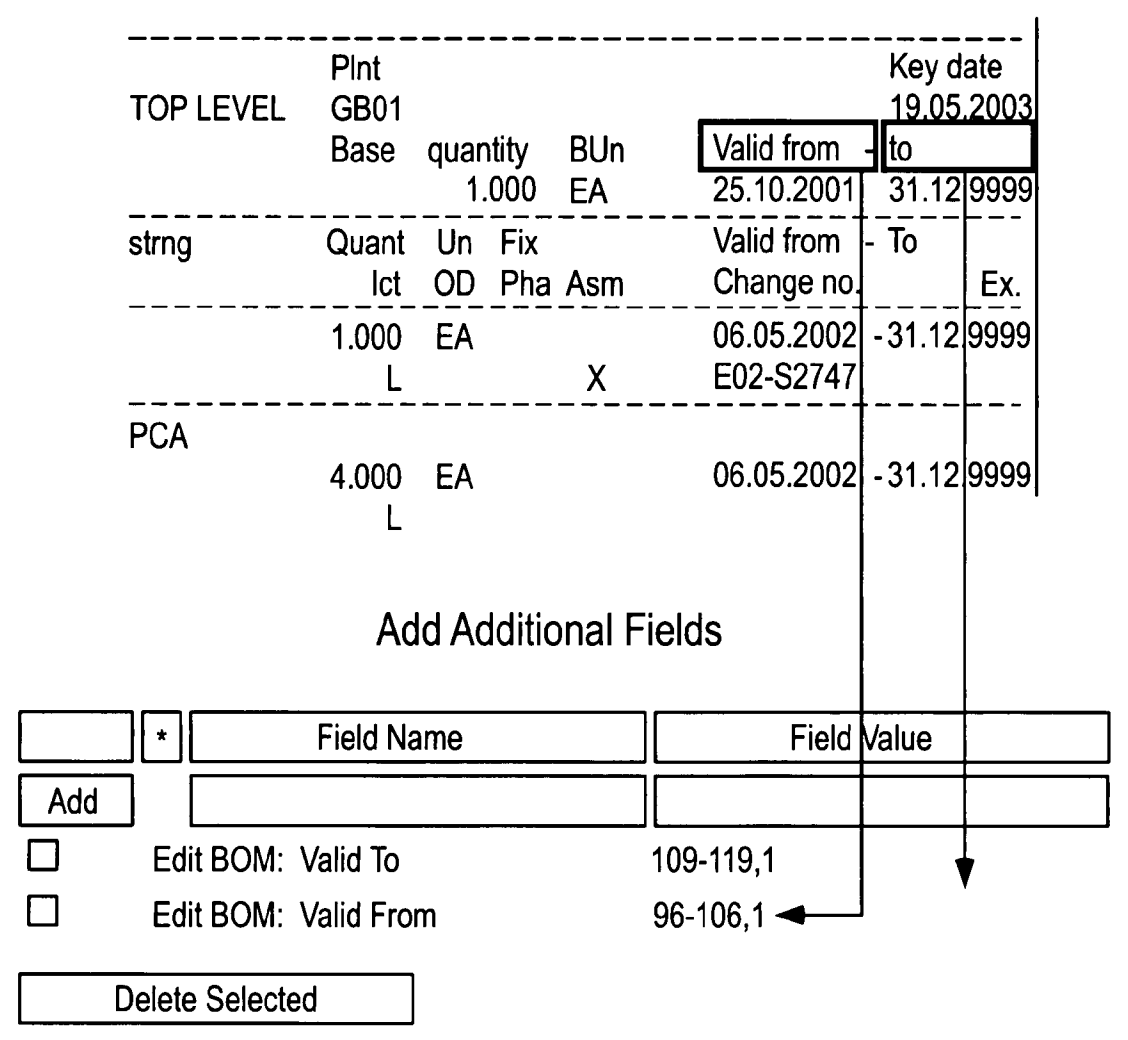
Figure 19:
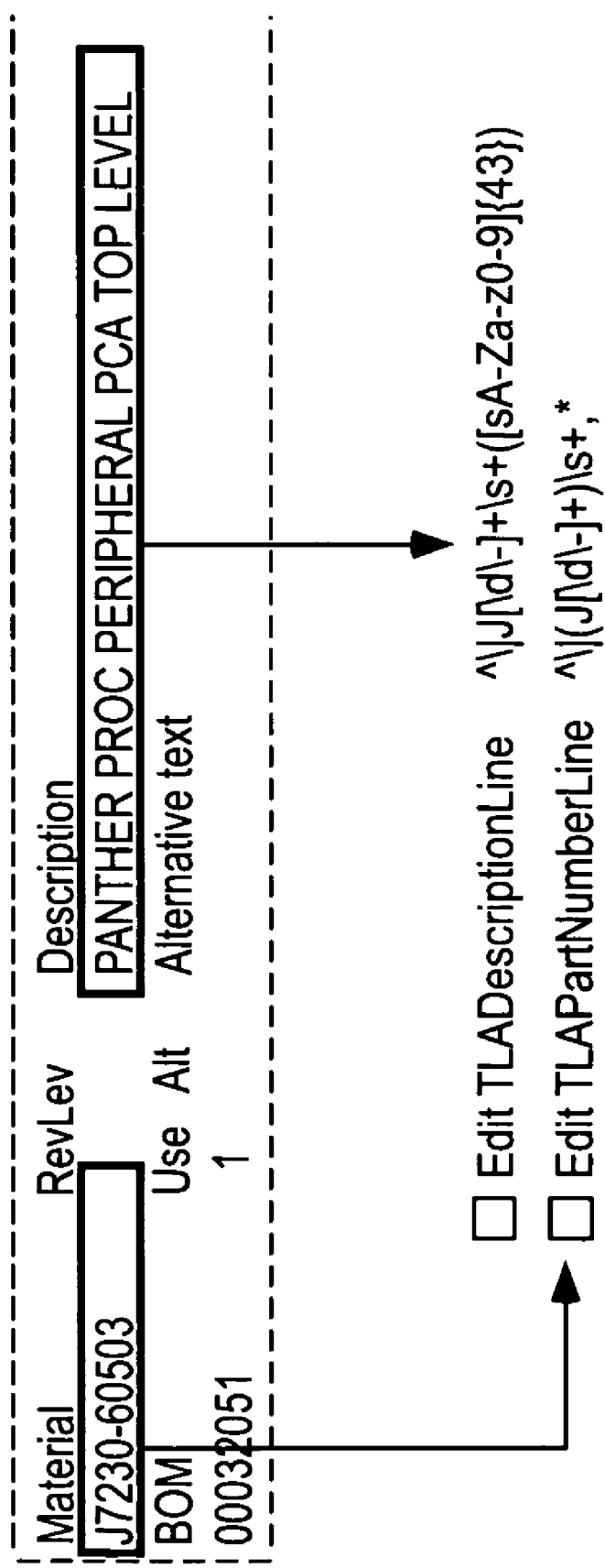

FIGS. 14-19 illustrate a similar process for performing a translation with a record in a fixed width format. FIG. 14 shows the repeatable blocks, fixed width margins and junk data typically found in such records. FIG. 15 10 is an illustration of setting a recognition pattern, where the configured profile may be dynamically chosen. To do this, string patterns are established to identify the file type, where they are distinguished in the profile bank. In operation, the first matched pattern is used for profile selection. FIG. 16 illustrates field coordinates that are set for the product record, and illustrates the item location within the record in relation to the location data in the Map Fields. In such a record, the fields are mapped according to the their name, 1602 and their location 1604 within the record. In FIG. 17, an illustration of the capturing of custom fields are illustrated, by field name and value, which indicates the location and value of the field. FIG. 18 illustrates the ignoring of "junk" fields, indicated by the pattern type in which the junk field is identified, and the respective line pattern in the record. FIG. 19 illustrates the extracting of data according to recognizable patterns. Such operations allow for the automation of the translation process, and those skilled in the art will understand that conventional software code and related routines exist to implement this functionality for different types of formats including the fixed width file illustrated and described herein.

Figure 21:
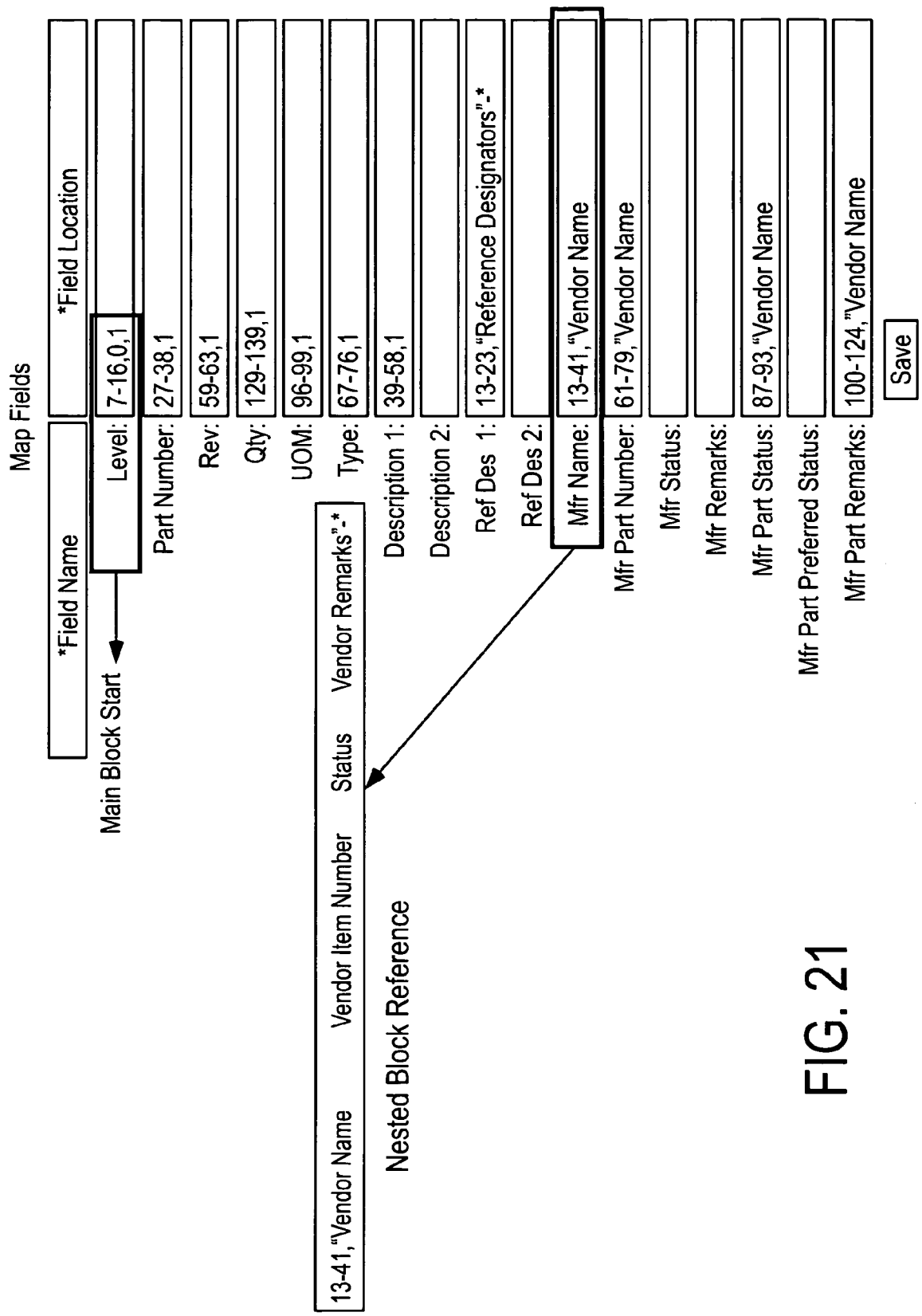
FIG. 21 illustrates the nested block profile, and the manner in which the nested block is recorded, according to field name and location.

FIG. 20 illustrates and GUI example of a complicated format, such as a nested block and how it is identified according to its location in the record. FIG. 21 illustrates the nested block profile, and the manner in which the nested block is recorded, according to field name and location.

Further provided within the enterprise system is a system and method for item interchange for mapping item indicia, such as Manufacturer and Customer Part Numbers (MPN & CPN respectively) to preferred part numbers. The system and method may be employed for mapping to preferred part numbers or to other item indicia. With the rapid obsolescence of part numbers, EMS and OEM vendors invest significant resources to map indicial know in the industry as "dirty" indicia, such as part numbers that are obsolete, defective, non-preferred or otherwise undesired, to relatively "clean" indicia, such as part numbers that are currently active, of low defect, preferred, or otherwise desired. Even with a high investment of manual resources, not all parts in a given Bill of Material (BOM) get cleansed at the appropriate time, which leads to returning the BOM back to Designing at a relatively late stage in the item on cycle, leading to expensive and often financially damaging delays. This can be catastrophic for a business. This process is currently done manually in the industry, typically by manual use of cumbersome spreadsheets and other system tools, and, again, usually leads to untimely changes, often too late to allow the system to progress smoothly and properly. For small businesses with relatively small inventory or item needs, this may not pose much of a problem. However, for larger enterprises, such as electronic products, such an improvement can reduce costs and shorten product delivery times dramatically.

The method enables customers to retain information about various cleansing and mapping operations done on each item number. This can be performed automatically to cleanse any item, such as component parts, that arrive in future record lists, such as Bills of Material (BOM) or Approved Manufacturer Lists (AML). Accordingly, the invention provides a system and method configured to cleanse a item record. Cleansing serves to standardize item names to improve sourcing and inventory consolidation.

The system includes a part number aliasing module configured to automatically convert item indicia, such as part numbers from a manufacturer for example, originating from separate sources to alternate indicia. An item knowledge base configured to store item information related to items allows the system to leverage historical and updated information on an item to help properly identify an item in a system. A method for cleansing an item record helps to standardize item names to improve sourcing and inventory consolidation. Such a method would look up a standard item indicia according to a standard indicia data base, and possibly converting the indicia to standard indicia for the item. If, for example, an item is a manufactured part, the method is configured to convert a first manufacturer name to a standard manufacturer name. The system would then map standard manufacturer name to a reference source manufacturer name, then search for an alias for the first manufacturer name. Then, a name alias may be selected to replace the first manufacturer name. The method may then map the manufacturer and customer part numbers to preferred part numbers by mapping the first alias name with another alias name. Those skilled in the art will understand that conventional software code and related routines exist to implement this functionality, and the invention is not limited by such conventional technology, and will also understand that the description included herein is adequate to enable such implementation.

Figure 22:
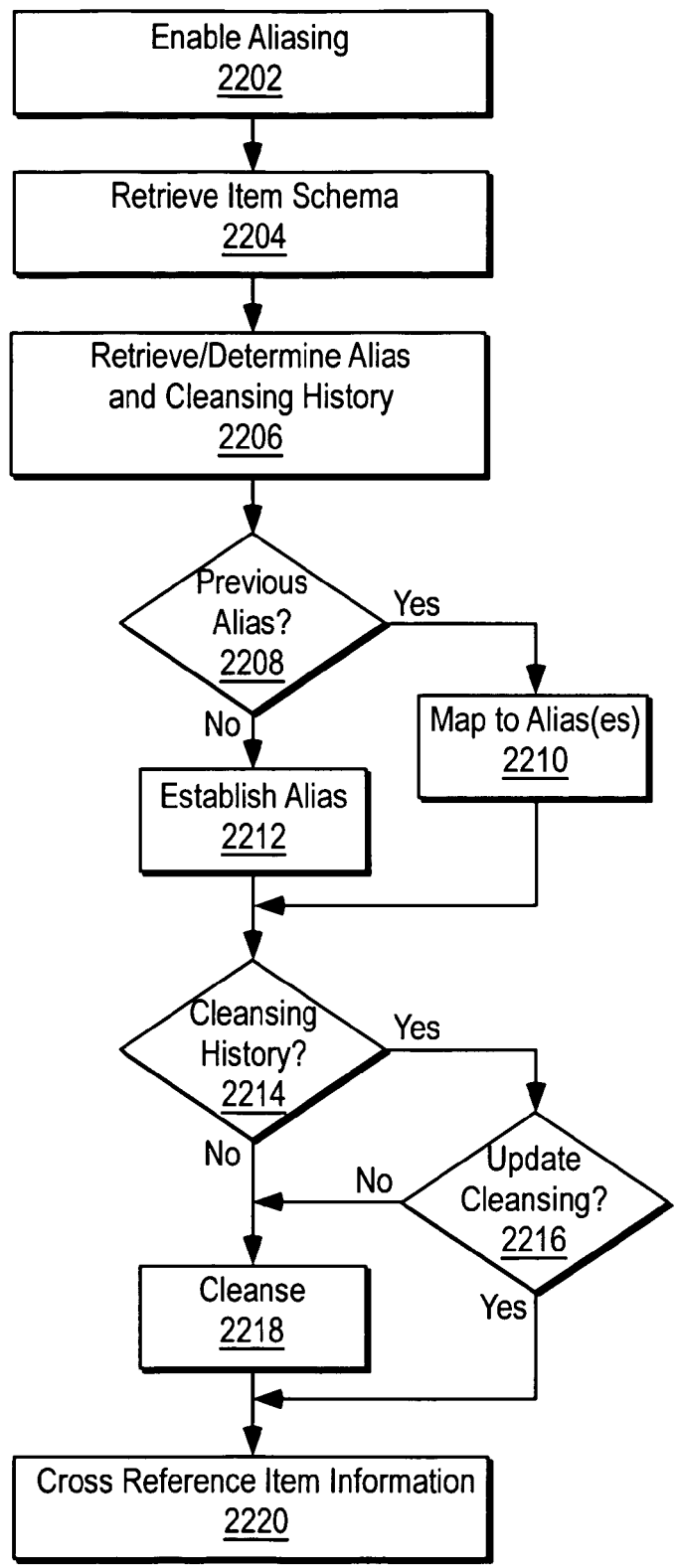
FIG. 22 is a flow chart illustrating aliasing operations is shown for one embodiment.

Referring to FIG. 22, a flow chart illustrating aliasing operations is shown for one embodiment. Aliasing is enabled in Step 2202, and item schema is retrieved in Step 2204. The item's alias and cleansing history is retrieved and determined in Step 2206. If there was a previous alias determined in Step 2208, then the process maps to any former aliases in Step 2210. If none exist, then an alias is established in Step 2212. The process then determines the cleansing history in step 2214. If there is a history, then it is determined whether the cleansing information is updated in Step 2216. If it is not existent or not updated, then the item information is cleansed. Otherwise, the process is then cross referenced in Step 2220.

Still further provided is a system and method for integrating item recipients, such as consumers of component parts, with content partners for item cleansing. Used within the system, a system and method are provided for integrating information with content partners for item cleansing. The method enables customers to achieve integration with content partners in an automated manner through a novel way using web services, map part content attributes to customer part attributes, and take business decisions based on these attribute validations. Our novel implementation also allows for integration for MPN validation and matching to legacy ERP system without requiring expensive code rewrite. As mentioned, this implementation is very automated, leading to increased quality, low processing time, and better visibility into the PLM process.

Those skilled in the art will understand that conventional software code and related routines exist to implement this functionality, and the invention is not limited by such conventional technology, and will also understand that the description included herein is adequate to enable such implementation.

Figure 23A:
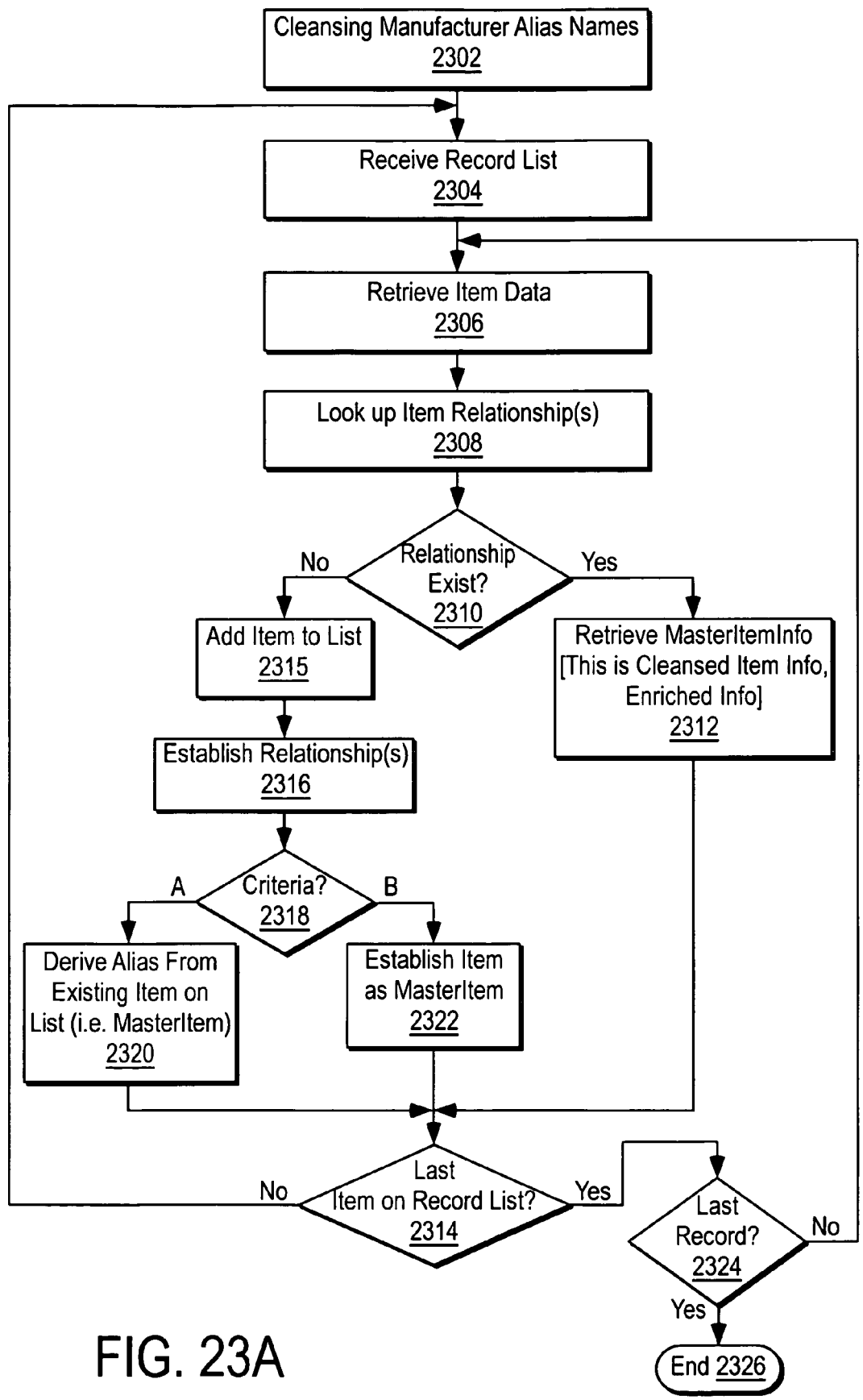
FIG. 23, is a flow chart of one embodiment of item cleansing.

Referring to FIG. 23A, one embodiment of item cleansing is illustrated. The process in initiated in Step 2302, and record list is received at Step 2304. Item data is retrieved in Step 2306, and the item relationships are looked up in Step 2308. If a relationship exists, then in Step 2312, the master item information is retrieved. This is cleansed and enriched item information, discussed in further detail herein. The process then queries in step 2314 whether the item is the last one of record. If no, the process goes to step 2306 for further item data. If yes, the process goes to step 2324 to determine whether the last record has been received. If no, the process returns to Step 2304 to retrieve another record. If yes, the process ends at Step 2326. Referring back to Step 2310, if no relationship exists, then the item is added to the item list in Step 2315, and any relationships that are relevant or useful are established in Step 2316. Here, business criteria determines whether and how an alias is established for an item. It may make sense for no alias to exist, for example when a part name and number is universal and not varied in the system. Depending on business criteria existing in Step 2318, if criteria A is preferred, then the alias is derived from an existing item on the list in Step 2320, the master item. The process then goes to Step 2314. If, however criteria B is preferred, then the item is established as the master item in Step 2322, and, again, the process goes to Step 2314.

Figure 23B:
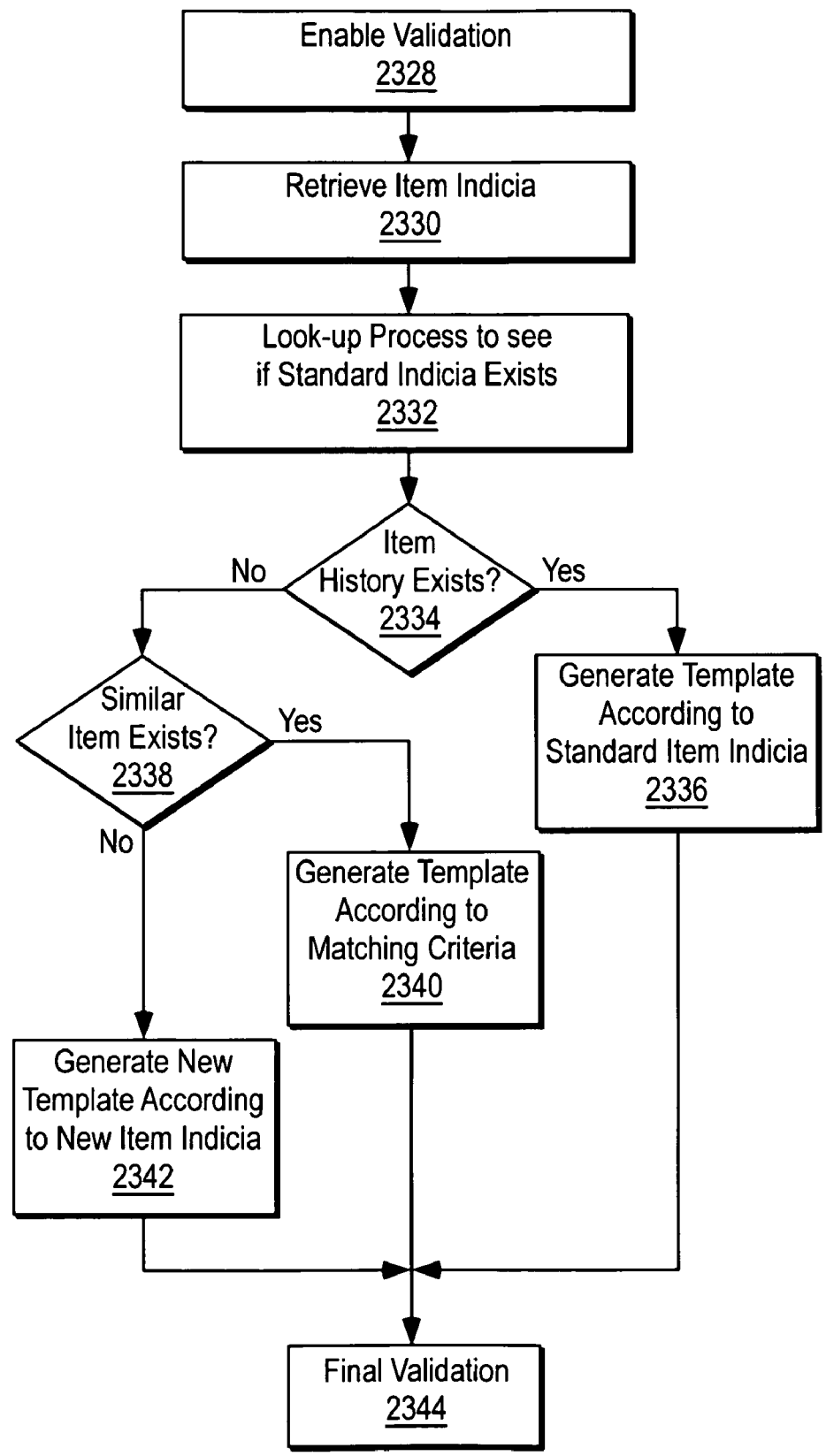

Referring to FIG. 23B, a process is illustrated in a flow chart for enabling validation. In Step 2238, the validation module is enabled. In step 2330, item indicia is retrieved. In step 2332, the look-up process is performed to see if standard indicia exists for the part or part number. In step 2334, it is determined if item history exists in the system. If it does exist, then the process proceeds to Step 2336, where a template is generated according to standard item indicia in the system. If not, the process moves from step 2334 to step 2338 where it is determined whether a similar item exists. If one then a new template is generated in step 2342. If a similar item does exist, then a template is generated according to the matching criteria of the item. After either of steps 2342, 2336 or 2340, the final validation is performed in step 2344.

Referring to FIGS. 24-29, further record cleansing is illustrated through GUI examples. Referring to FIG. 24, an example of a cleansing interface allows a system to automatically convert item source name variants, such as manufacturer name variants, to standard item name variants, such as manufacturer names, as illustrated. In operation, once established, the process can occur automatically. In this example, MSL is the customer internal name, and the interface is configured to map standard manufacturers. According to the invention, variants to the item source names, such as manufacturer names, can be automated once they are established. For example, much confusion can occur in a product enterprise, particularly for manufacturers that operate around the world and according to different names. According to the purchaser of the item, it may not make a difference what the supplier or manufacturer name is, but it needs to standardize the naming of the item at every level, including the variations on the manufacturer names. Similarly, if a universal supplier or multi-manufacturer clearing house distributes items such as component parts, it may make sense to simply identify the supplier of the item, and simplify the identification process. According to the invention, the master list accomplishes this. Referring to FIG. 25, a look-up engine for looking up standard manufacturer names is illustrated, simplifying the process for a user. FIG. 26 illustrates an interface configured to allow the mapping of standard manufacturer names, in the case of component parts, to reference source manufacturer names using the part miner mapping system. Such a system may employ a conventional data mining algorithm or system known in the art. In one embodiment, the administration module provides an interface to customize the SQL™ query to retrieve the standard manufacturer name.

Figure 27:
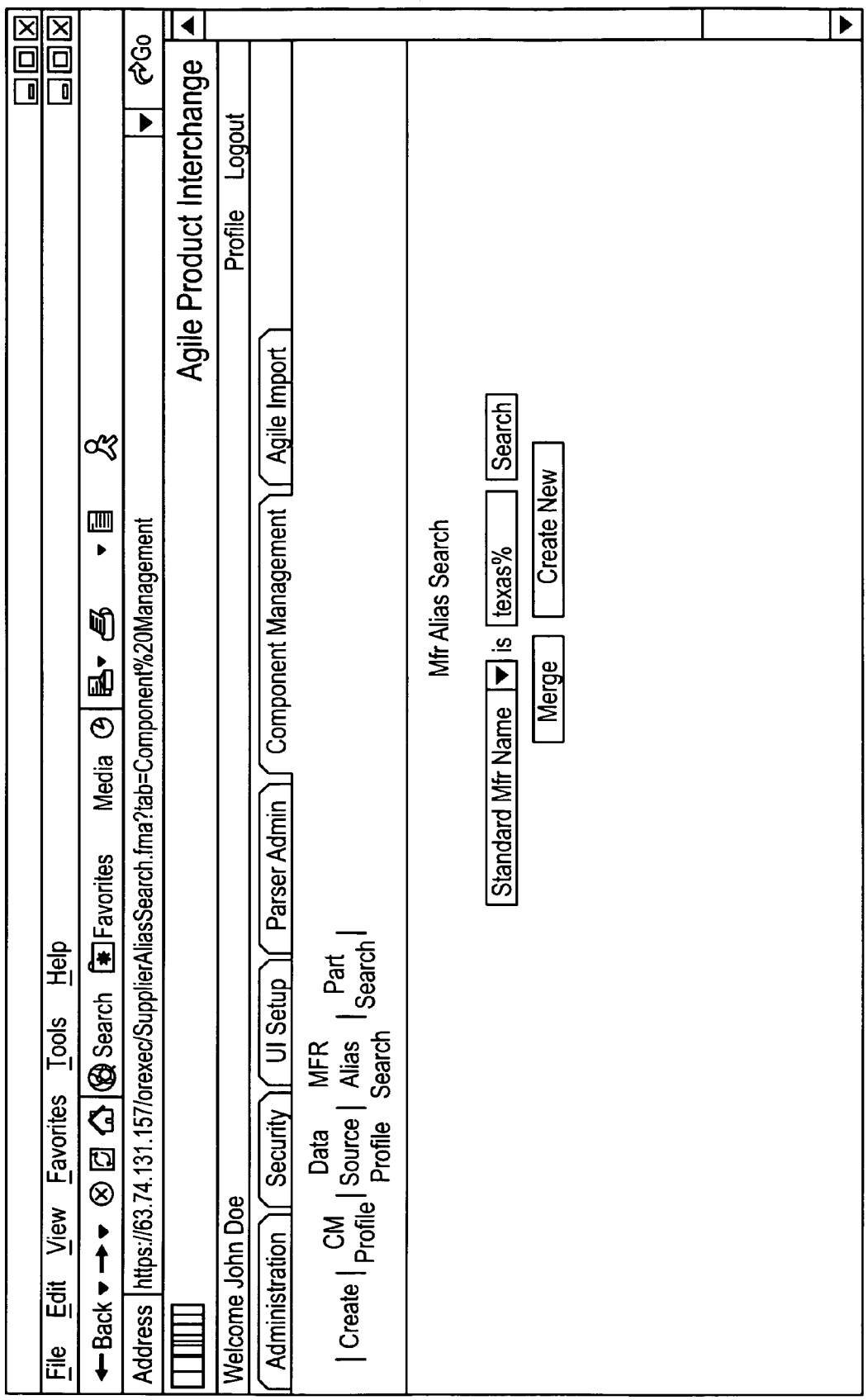
Figure 28:
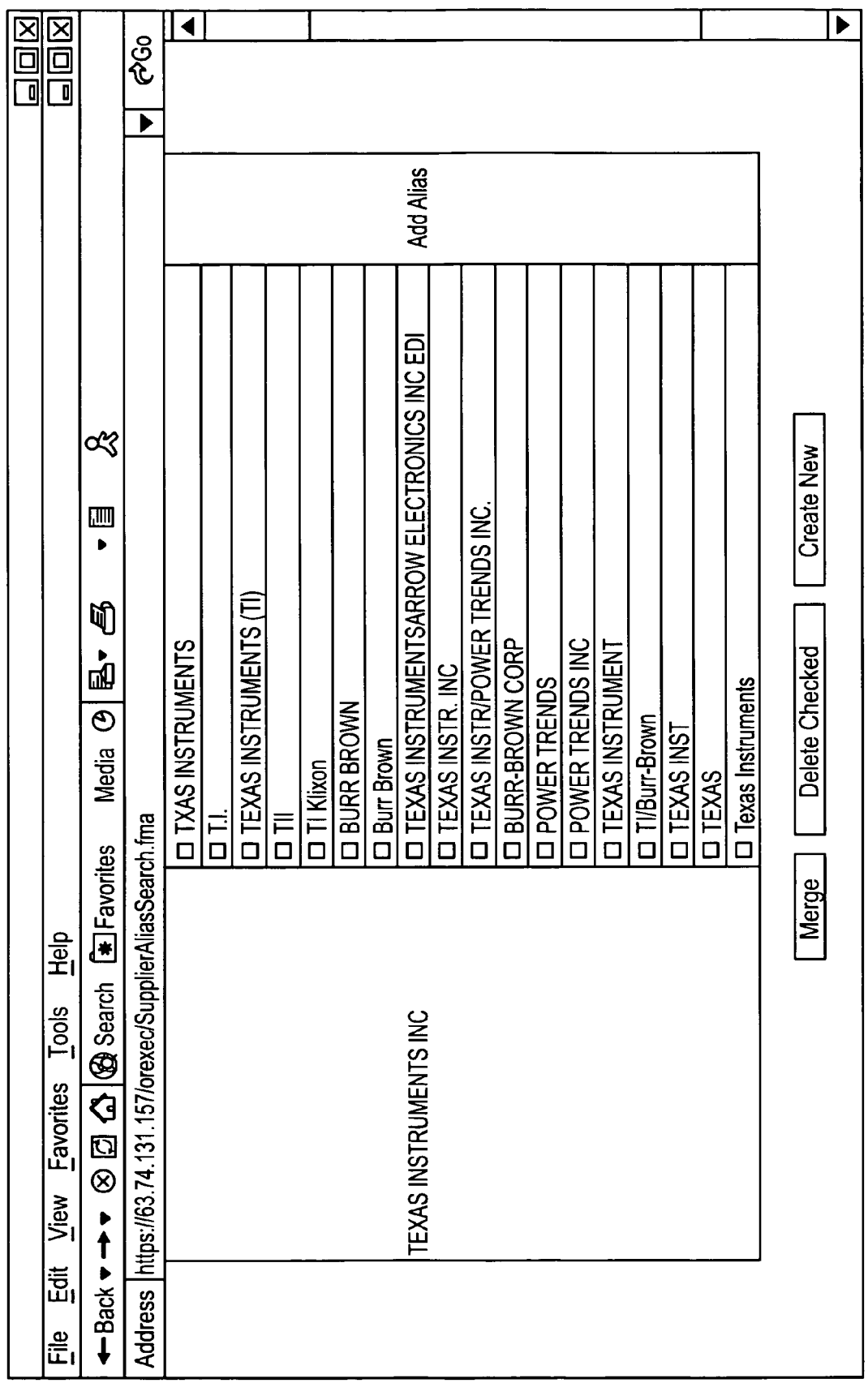

FIG. 27 is an interface allowing searching of all aliases for manufacturer names. In FIG. 28 the interface allows a user to delete or add manufacturer name aliases. And, in FIG. 29, the interface allows a user to view and select part number aliases. These and other interfaces provide an infrastructure for cleansing item indicia according to the invention.

The system further provides a method for validating an item record by use of templates. Validation incorporates intelligence gathered throughout the product life cycle, including alias and cleansing activity. A database is configured to store item historical information for use in updating item records. Conventionally, this is performed on a ad hoc basis, where record keepers maintain item information, such as part numbers, names and manufacturers in spreadsheets. According to the invention, software code can work to organize such information and maintain updates as an item, such as a component part, evolves throughout a life cycle. The information can lend itself to methods of looking up and updating item information in item lists, such as component part information in BOMs.

In operation, such a method may include first looking up a standard item indicia according to the item record in a data base. If there is a history of the item, then the system can automatically generate a part matching template. The method may further include analyzing indicia matching results from the database, and selecting the item information template that is most near matching results. Validation consists on running a sequence of "smart" rules to verify the integrity of the indicia. Such rules include checking the BOM/AML structural integrity, as well as the integrity of its attributes of item indicia, for example IPN and MPN parts. Those skilled in the art will understand that conventional software code and related routines exist to implement this functionality, and the invention is not limited by such conventional technology, and will also understand that the description included herein is adequate to enable such implementation.

Referring to FIG. 30a, a method of validation is illustrated, and is enabled in Step 3001. Item indicia is retrieved in Step 3004, and a look-up process is invoked to determine whether standard indicia exists in Step 3006. If it is determined in Step 3008 that item history exists, then a template is generated according to standard item indicia, and final validation is performed in Step 3012. If, back in Step 3008, no item history exists, then it is determined whether any similar item history exists in Step 3014. If yes, then a template is generated according to matching criteria in Step 3016. If no, then a new template is generated in Step 3018 according to new item indicia.

Referring to FIG. 30b, a validation system 3020 is illustrated for a sample case of a BOM, AML, Parts list or BOM Quote received as an input 3022. Using the interchange 3022, a system can draw information from different sources 3024, 3026, 3028 through respective content adapters 3030, 3032, 3034, to validate incoming item record lists that may be raw (incomplete, unaliased or unenriched) or dirty. The interchange may validate such records, then output a validated quote 3036, which may include a redline version of the original record, and may include engineering change orders (ECOs) or management, material or manufacturer change orders (MCOs) in the record, to other sources 3038, 3040.

Referring to FIG. 31, an example of structural validation rules is illustrated. The user interface is configured to enable a user to select or modify validation rules according to a simple check-box configuration. Structural validation rules can be selected from the interface. According to the invention, a system using this novel validation configuration would be able to automatically validate items once the rules are configured. Referring to FIG. 32, an example of an interface to enable interactive exception handling is illustrated. Once the errors are fixed using this screen, then the validation rules can be executed again to ensure that the warning and/or the errors have been fixed.

Figure 36:
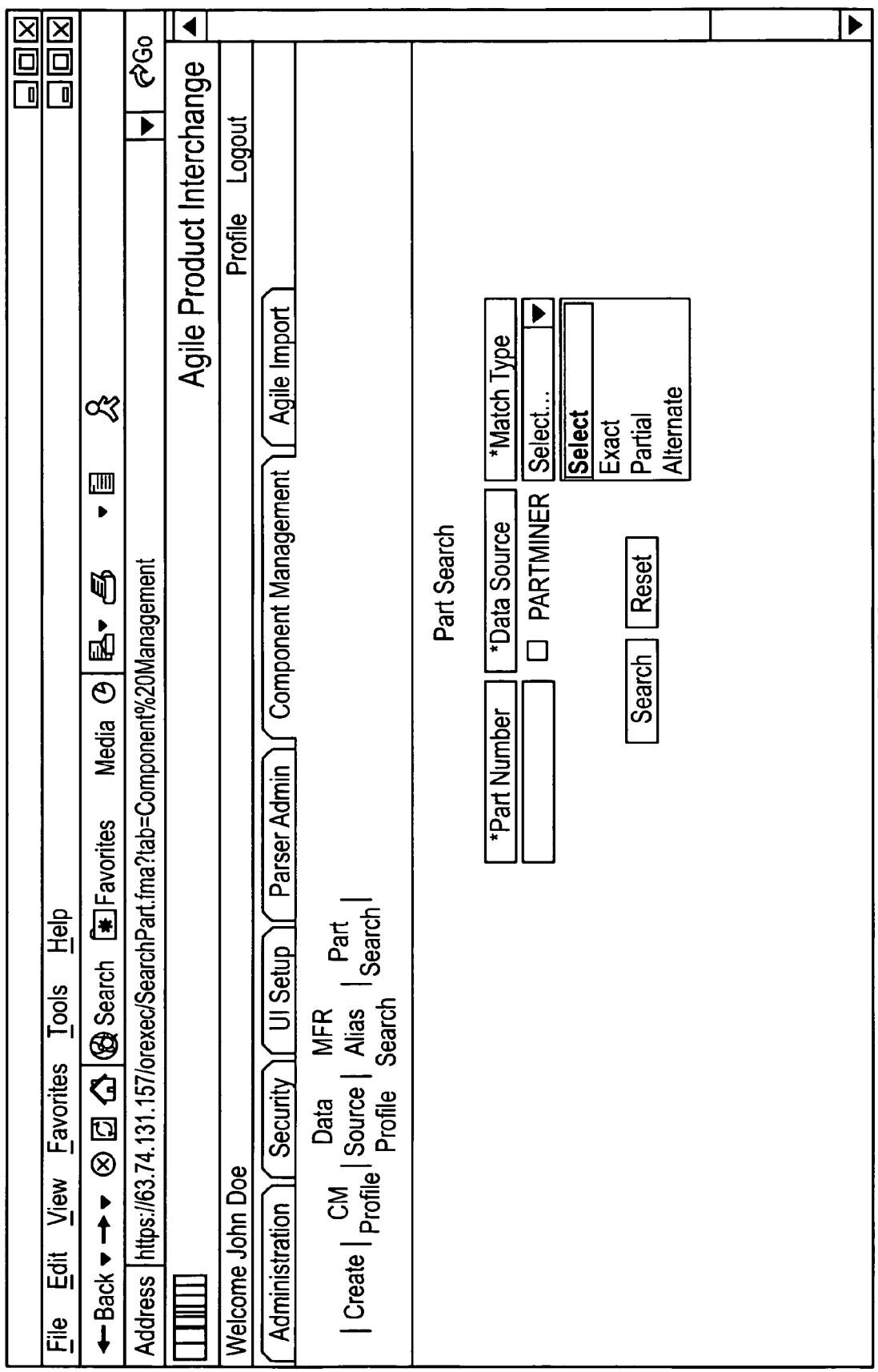

Referring to FIGS. 33-36 illustrate user interfaces related to validation operations, and are indicative of the flexibility of such validation operations according to the invention. In FIG. 33, and example of creating a recipe is illustrated, where validation rules, data sources and matching rules are established by a user. FIG. 34 illustrates an interface for viewing part matching results after a match operation is completed. FIG. 35 illustrates an interface for viewing near match results, allowing a user alternatives to search results. FIG. 36 illustrates an interface for a single part lookup operation.

The system may still further include a system and method for enriching item indicia. FIG. 37 is an interface illustrating the capabilities and benefits of record enrichment. The invention provides automated enrichment of multiple attributes from multiple sources. The functions allow a system to gather all available intelligence of an item, such as a component part, improving item selection and decision making related to items and related information. Enrichment includes the persisting of alias relationships between dirty and clean items to update and generally improve the identity and integrity of the item information. Items typically have multiple attributes that describe many different aspects of an item, such as a component part (part name, manufacturer, supplier, part number, date of last update, internal part number) and including other information related to identifying the item, how it is used, its price, sources, lead time from different sources, etc. With the aliasing and cleansing techniques discussed above, automatic enrichment processes can be performed to mine out item attributes and update and enrich the information. In many conventional operations, items are updated on an ad hoc basis, and only available information is maintained as available. According to the operation, information can be gathered or created from multiple sources, maintained internally, and perpetuated in a system, enriching the attributes and related information related to a part. Then, when aliasing, cleansing and validation operations are performed, the enriched information can persist in the system. These operations can overlap a good deal, providing integrity to attributes and related information.

Figure 39:
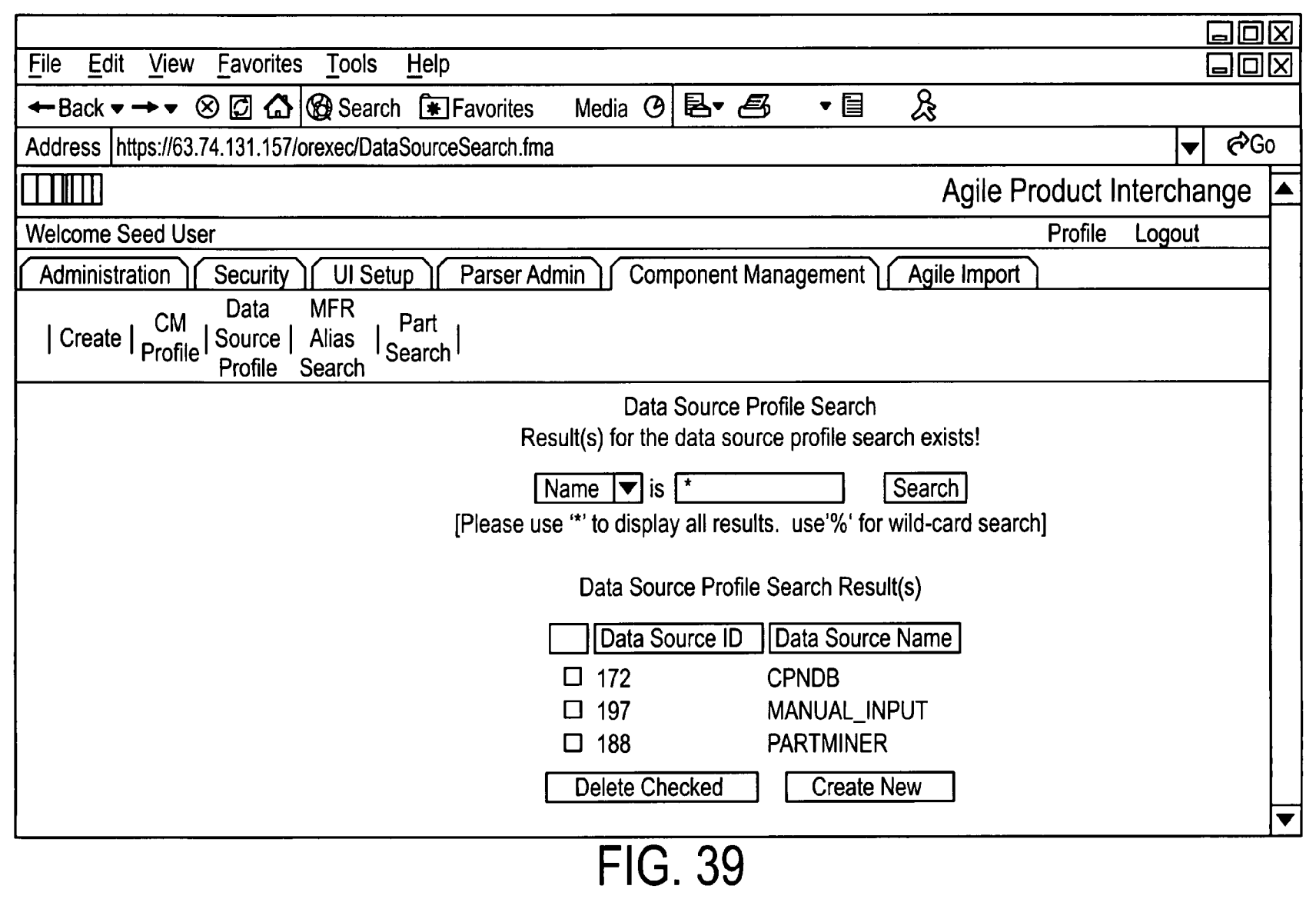

In operation if the item is new in the system, the method may include first assigning a commodity code, such as at the interface of FIG. 38 that illustrates the input criteria for a code. The operation also is configured to search data source profiles as shown in FIG. 39, and creating a new data source profile in FIG. 46. An enrichment module may then automatically assigning one or more attributes to a part according to universal component intelligence stored in the database. Alternatively, an administrator module can search data source profiles to a matching source name. The system may then search data source profiles by a data source identifier and a data source name. The system may include a component intelligence module configured to gather information indicia for components and an enrichment module configured to match component indicia to the part.

Referring to FIG. 41, a process of enrichment is illustrated. The process is enabled in Step 4102, and a commodity code is assigned at Step 4104. Then, it is determined in Step 4106 whether a profile exists for the item. If there is a profile, then it is retrieved in Step 4108, if not, it is created in 4110. Such a profile may include an item identifier, like a part name or number in the case of a component part, and other information related to the item, such as source information, historical information on the item, and other information related to the item either within the product interchange system, within an enterprise, or in other areas relevant to maintaining attributes of an item. In Step 4112, data is mined from sources within the interchange. This may include searching database storage or other source in Step 4114, and such searches may include a search by some type of standard item identifier, such as a item name or number, and a source name. The data is retrieved in Step 4116, and relevant data retrieved is matched to item indicia in Step 4118. The found and matched data, hence enriched data, is then stored in Step 4120.

Figure 42:
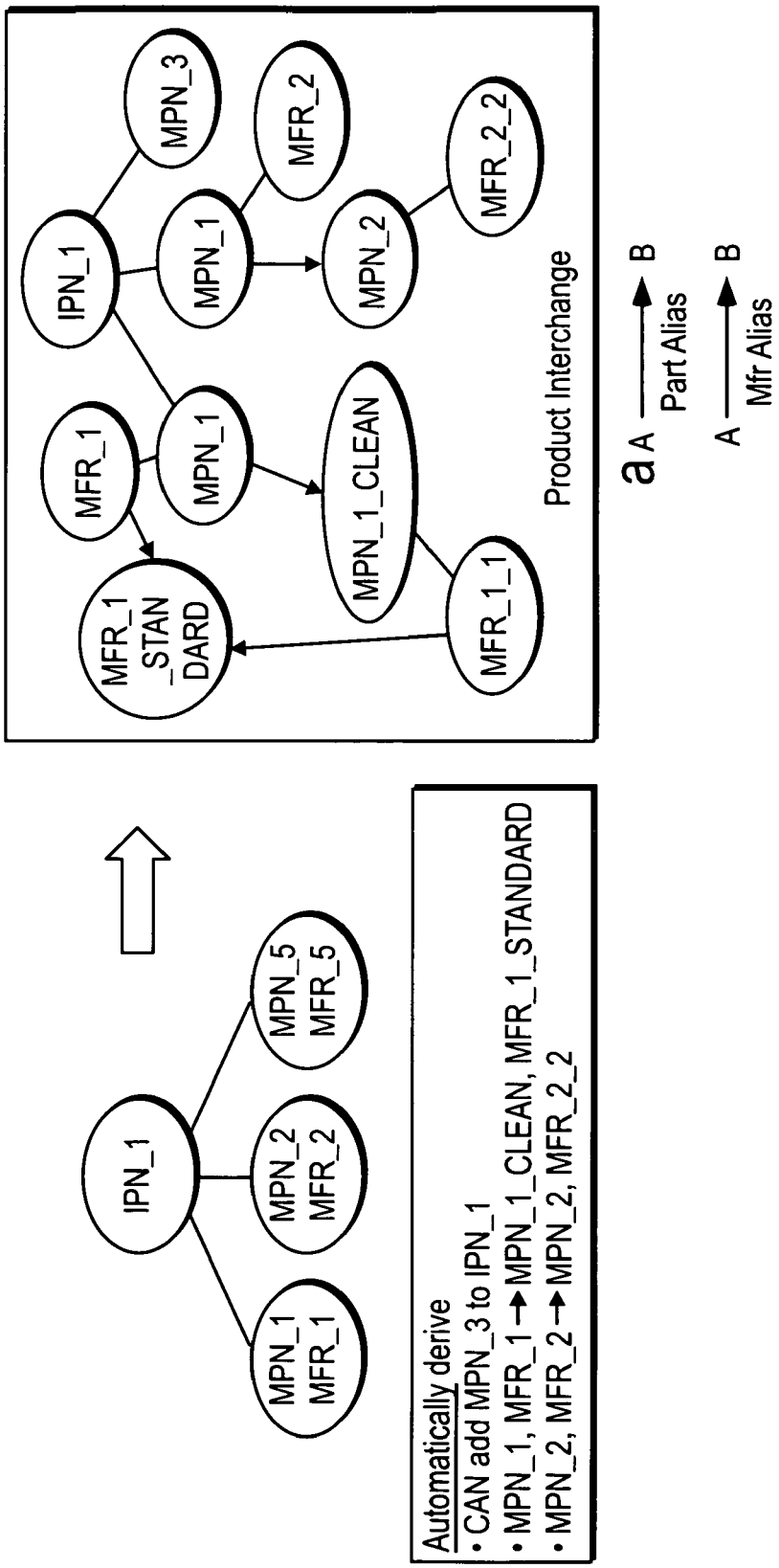
Figure 44:
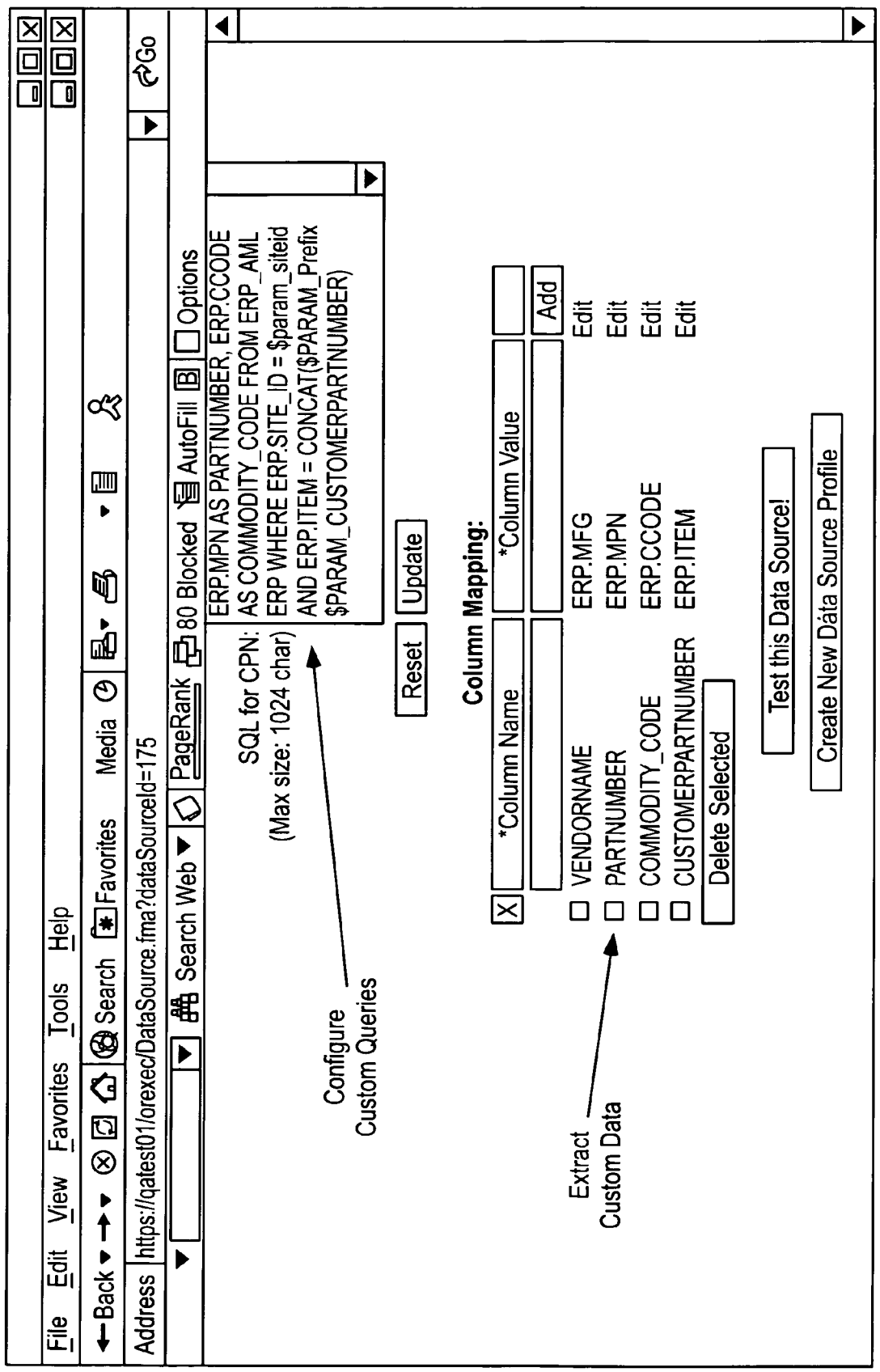
Figure 45:
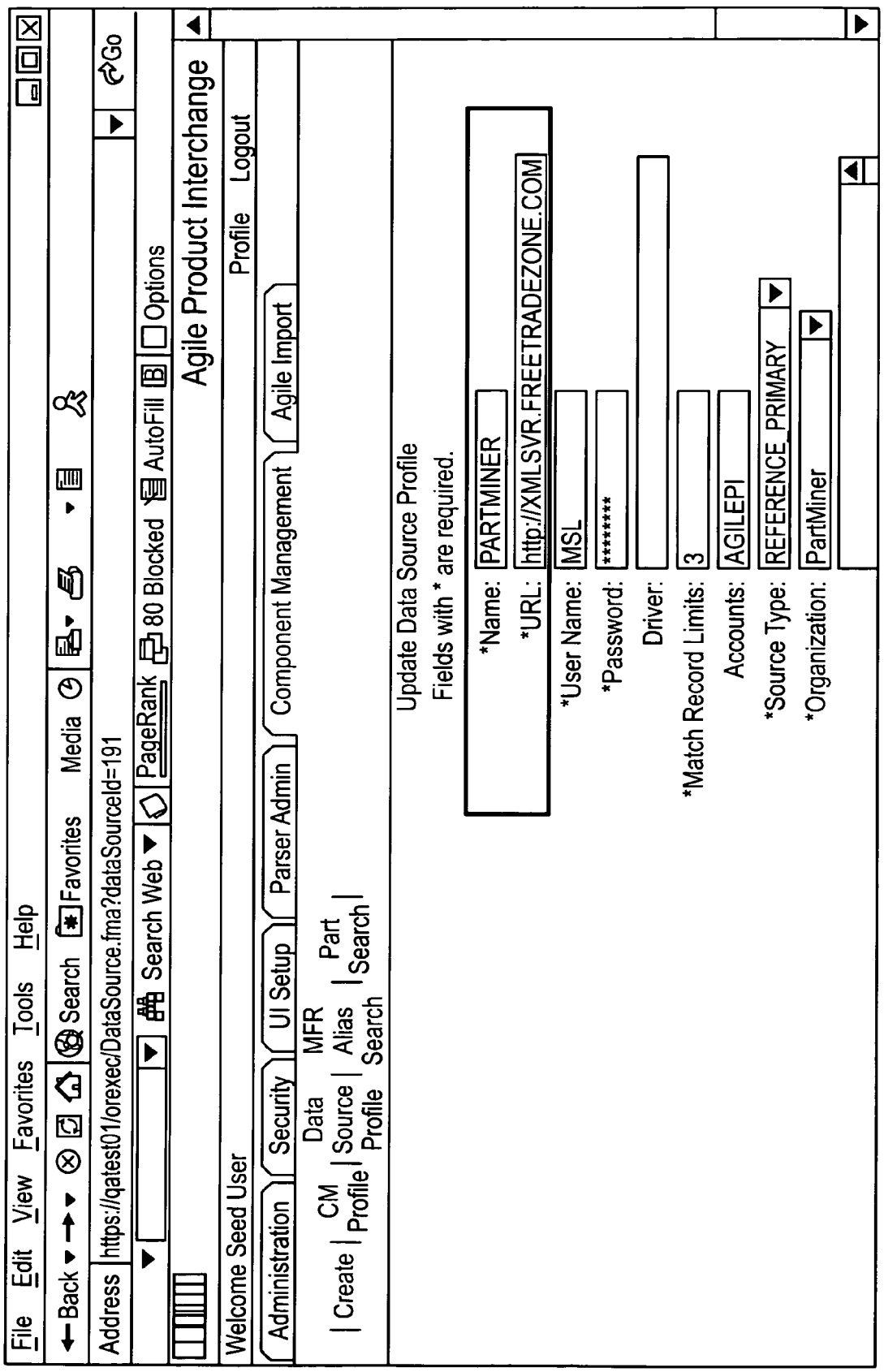
Figure 46:
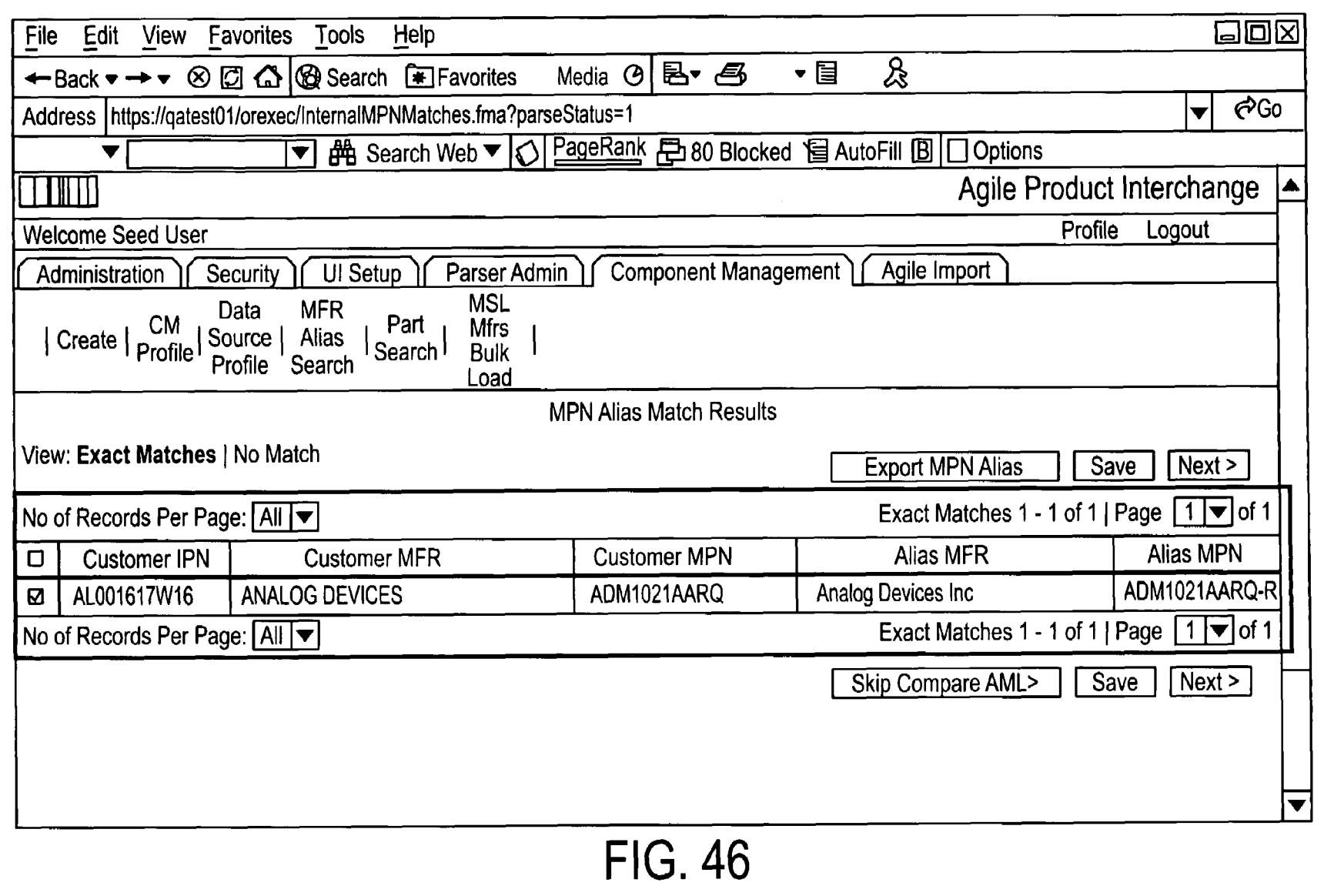
Figure 47:
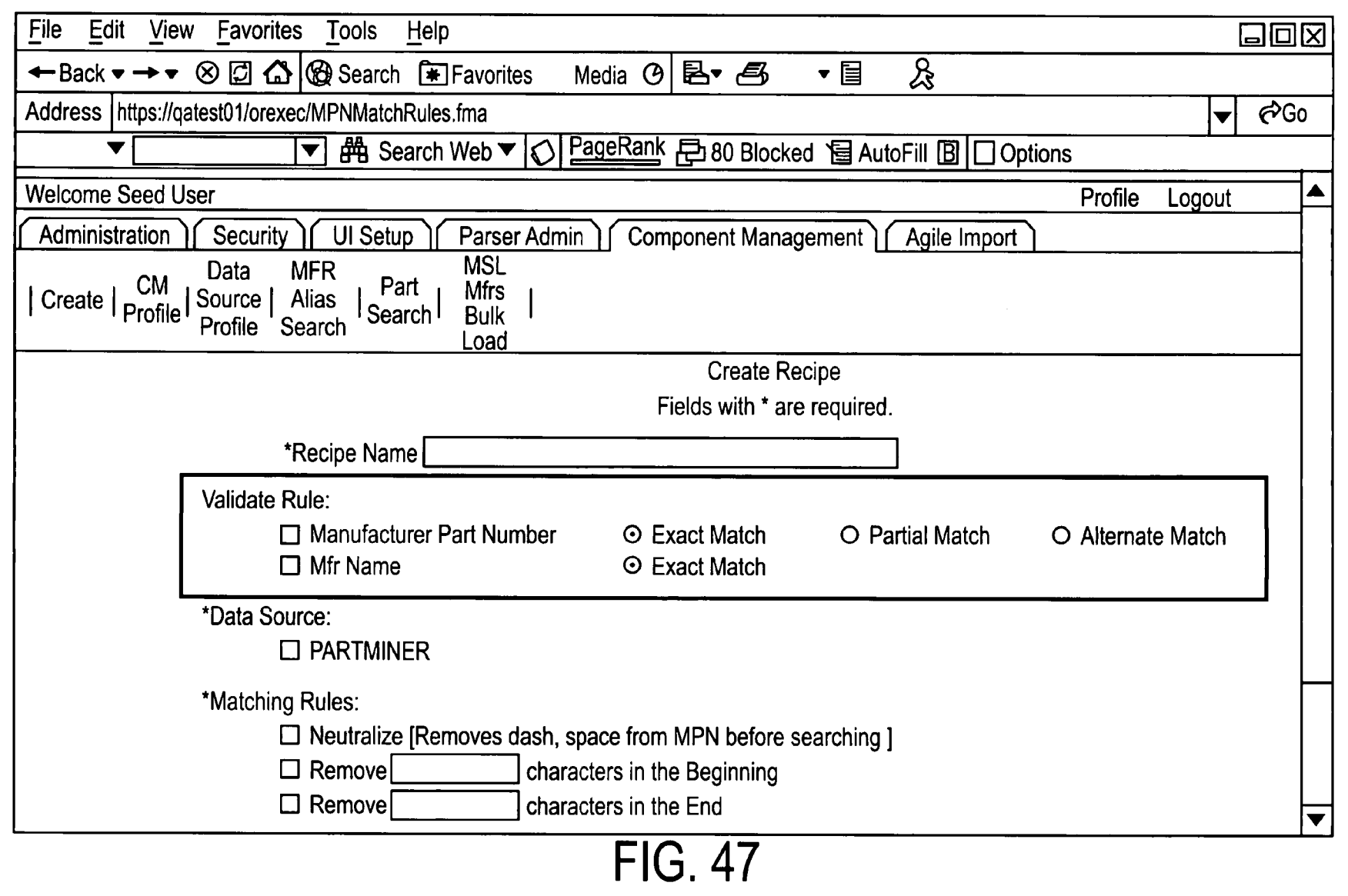

Referring to FIGS. 42-49, user interfaces illustrating record enrichment are illustrated. FIG. 42 illustrates the concept of enrichment from the standpoint of component part numbers. The part numbers illustrated as IPN (internal part numbers), MPN (manufacturer part numbers), MFR (manufacturer name) and other identifiers indicate the incoming item indicia in incoming records. These are converted to standardized component part names, and are extended to clean (CLEAN), standard (STANDARD), and other names, and are associated according to the arrows and line connectors, that indicate that the product interchange standardizes the names in order to enable universal use of the item indicia in the system. FIG. 43 illustrates the use of component management for integrating information with an internal source. FIG. 44 illustrates an interface used for configuring custom queries to customize the product records. Custom data can also be extracted, where column mapping is employed to locate and map data located in an indicated column. According to the invention, particular item attributes can be mapped according to the column name and value. Columns can be automatically mapped according to the values indicated by the input. FIG. 45 illustrates the integration of a part miner application, which is an example of a searching engine used to search for relevant data used to alias, validate and enrich item indicia. Data searching tools can be integrated into the system, whether they are internal or vendor provided, and can be named and mapped into the system, as for example the PARTMINER searching engine in this example. Those skilled in the art will understand and agree that different searching techniques exist that can be integrated in the system, and that the invention contemplates other such integrations and is not limited to any particular searching application. FIG. 46 illustrates an interface utilized to detect previously used item indicia, such as detecting previous MPN aliasing. FIG. 47 illustrates the configuration of custom query templates. Recipes that are implemented by internal algorithms for integrating the data into the interchange. FIG. 48 illustrates the ability to enrich item records, BOM or AML in this illustration, through a common framework within the interchange. The interface shows the exact matches found from processing the recipe of FIG. 47 for example. The interface allows a user to observe and edit the resulting enrichment of data on a tabular form. Such a process can also produce non-matching alternatives, such as that illustrated in the interface of FIG. 49.

The invention may involve a number of functions to be performed by one or more computer processors, such as a microprocessor or and old legacy mainframe computer. The microprocessor may be included in many different forms of computers such as severs and personal computers. The microprocessor may be a specialized or dedicated microprocessor that is configured to perform particular tasks by executing machine readable software code that defines the particular tasks. Applications, data processors, data generators, and other devices will be described that are embodied in a computer in the form of computer readable code that, when executed by a computer, configures the computer to perform the functions of these entities. The microprocessor may also be configured to operate and communicate with other devices such as direct memory access modules, memory storage devices, Internet related hardware, other computers and other devices that relate to the processing and transmission of data in accordance with the invention. The software code may be configured using software formats such as Java, C++, XML and other languages that may be used to define functions that relate to operations of devices required to carry out the functional operations of a computer that employs the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention, which is defined by the appended claims.

Within the different types of computers that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such servers for maintaining information that is frequently retrieved by a central processing unit, but that is not often altered within the persistent memory, unlike the cache memory. Main memory is also included in such servers for storing and retrieving larger amounts of information such as data and software applications configured to perform functions according to the invention when executed by the central processing unit. The main memory may be a disk drive or other volatile memory device. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, nor any commonly used protocol for storing and retrieving information to and from these memory devices respectively.

Although the description above uses language that is specific to structural features and/or methodological acts, it is to be understood that the invention defined in the appended claims is not limited to the specific features or acts described. Rather, the specific features and acts are disclosed as exemplary forms of implementing the systems and methods discussed herein. The invention is defined by the claims appended hereto, and all equivalents.

The invention claimed is:

1. A method comprising:
   receiving, by a computer system from a first source, a first record related to an item;
   determining, by the computer system, a first indicium in the first record identifying the item;
   translating, by the computer system, the first indicium to a standard system indicium;
   receiving, by the computer system from a second source, a second record related to the item;
   determining, by the computer system, a second indicium in the second record identifying the item, the second indicium being distinct from the first indicium;
   translating, by the computer system, the second indicium to the standard system indicium; and
   storing, by the computer system, the first and second indicia as alias indicia for the item.

2. The method of claim 1 wherein the first indicium and the second indicium include at least one of the item's name, manufacturer, supplier, assembler or purchaser.

3. The method of claim 2 wherein multiple levels of alias indicia are established for the item.

4. A method according to claim 1, further comprising performing exception handling.

5. A method according to claim 4, wherein the exception handling is performed in an interactive manner.

6. The method of claim 1 further comprising:
   establishing structural validation rules for defining the manner in which the item information is validated; and
   performing exception handling in an interactive manner.

7. The method of claim 1 wherein translating the first indicium to the standard system indicium comprises:
   looking up a standard item name for the item according to a standard indicia database; and
   converting an item name included in the first indicium to the standard item name.

8. The method of claim 1 further comprising validating the record by:
   looking up a standard item name for the item according to a standard name data base;
   if the item has a history, generating a template according to the item history;
   if the item has no history and a similar item exists, automatically generating an item matching template by analyzing part matching results and generating an item template according to the matching results.

9. The method of claim 8 further comprising running a sequence of smart rules to verify the integrity of the record.

10. The method of claim 8 further comprising, if the item has no history and no similar item exists, generating a new template for the item.

11. The method of claim 1, wherein the first and second indicia include internal part numbers (IPN) and manufacturer part numbers (MPN).

12. A system comprising:
    a processing component configured to:
       receive, from a first source, a first record related to an item;
       determine a first indicium in the first record identifying the item;
       translate the first indicium to a standard system indicium;
       receive, from a second source, a second record related to the item;
       determine a second indicium in the second record identifying the item, the second indicium being distinct from the first indicium;
       translate the second indicium to the standard system indicium; and
       store the first and second indicia as alias indicia for the item.

13. The system of claim 12 wherein the processing component is further configured to manage exceptions related to the item and routing of item information.

14. The system of claim 12 wherein the processing component is further configured to add new indicia to the record based on additional intelligence known about the item in an enterprise, the adding comprising:
    assigning a commodity code;
    creating a new data source profile;
    automatically assigning a plurality of attributes to a part according to a universal component intelligence database; and
    searching data source profiles by a data source identifier and a data source name.

15. A computer-readable medium having stored thereon program code executable by a computer system, the program code comprising:

code that causes the computer system to receive, from a first source, a first record related to an item;

code that causes the computer system to determine a first indicium in the first record identifying the item;

code that causes the computer system to translate the first indicium into a standard indicium;

code that causes the computer system to receive, from a second source, a second record related to the item;

code that causes the computer system to determine a second indicium in the second record identifying the item, the second indicium being distinct from the first indicium;

code that causes the computer system to translate the second indicium into the standard indicium; and code that causes the computer system to store the first and second indicia as alias indicia for the item.

\* \* \* \* \*